US012114156B2

(12) United States Patent
Yapici et al.

(10) Patent No.: US 12,114,156 B2
(45) Date of Patent: Oct. 8, 2024

(54) MUTUAL AUTHENTICATION FOR RELIABLE CONFIGURATION RECEPTION OVER REFERENCE SIGNALS

(71) Applicant: QUALCOMM Incorporated, San Diego, CA (US)

(72) Inventors: Yavuz Yapici, Florham Park, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 249 days.

(21) Appl. No.: 17/818,264

(22) Filed: Aug. 8, 2022

(65) Prior Publication Data

US 2024/0048983 A1 Feb. 8, 2024

(51) Int. Cl.
*H04W 12/06* (2021.01)
*H04L 41/0816* (2022.01)
*H04W 12/062* (2021.01)
*H04W 12/084* (2021.01)

(52) U.S. Cl.
CPC ....... *H04W 12/062* (2021.01); *H04L 41/0816* (2013.01); *H04W 12/084* (2021.01)

(58) Field of Classification Search
CPC .......................... H04W 12/062; H04W 12/084
See application file for complete search history.

(56) References Cited

U.S. PATENT DOCUMENTS

| 9,608,698 | B2 * | 3/2017 | Sessink | G07C 9/00309 |
| 2008/0185436 | A1 * | 8/2008 | Laviolette | G06K 19/06 |
| | | | | 235/454 |
| 2017/0338956 | A1 | 11/2017 | Badawy et al. | |
| 2019/0302964 | A1 * | 10/2019 | Kyosuna | H04N 9/3155 |
| 2022/0141064 | A1 | 5/2022 | Horn et al. | |

(Continued)

OTHER PUBLICATIONS

International Search Report and Written Opinion—PCT/US2023/028382—ISA/EPO—Oct. 23, 2023.

(Continued)

*Primary Examiner* — William S Powers
(74) *Attorney, Agent, or Firm* — Procopio, Cory, Hargreaves & Savitch

(57) ABSTRACT

A first network node may transmit an authentication proof to a second network node. The authentication proof may be based on a first credential associated with the first network node. The first network node may be authenticable based on the authentication proof. The second network node may identify whether the first network node is authentic based on the authentication proof. The second network node may transmit a configuration request to the first network node. The configuration request may include a phase-modulated indication of a second credential associated with the second network node. The configuration request may be based on a random phase. The second network node may be authenticable based on the configuration request. The first network node may transmit a configuration response to the second network node. The configuration response may include a phase-modulated confidential parameter. The configuration response may be based on the configuration request.

30 Claims, 13 Drawing Sheets

(56) References Cited

U.S. PATENT DOCUMENTS

2022/0150022 A1* 5/2022 Newman ............... H04L 5/0051
2022/0150063 A2 5/2022 Ramabadran et al.

OTHER PUBLICATIONS

Wu X., et al., "A Physical-Layer Authentication Assisted Scheme for Enhancing 3GPP Authentication", Arxiv.org, Cornell University Library, 201 Olin Library Cornell University Ithaca, NY 14853, Feb. 26, 2015, pp. 1-12, XP080807906, The Whole Document.
Xie N., et al., "A Survey of Physical-Layer Authentication in Wireless Communications", IEEE Communications Surveys Tutorials, IEEE, USA, vol. 23, No. 1, Dec. 3, 2020, pp. 282-310, XP011839803, The Whole Document.

* cited by examiner

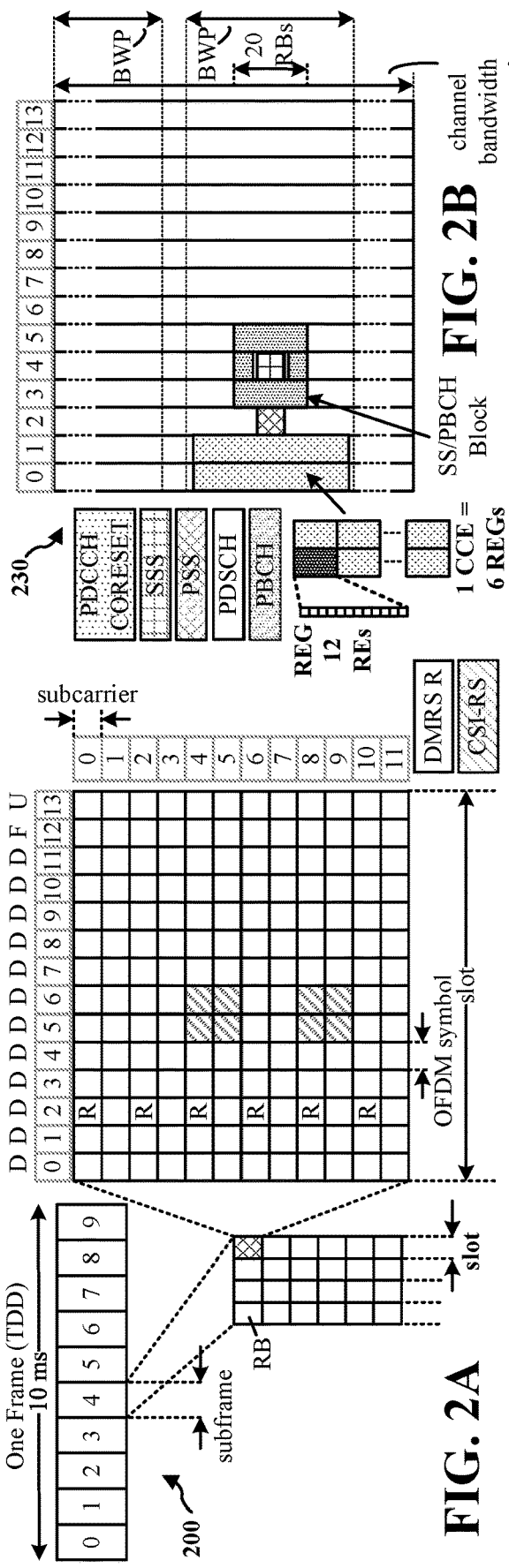
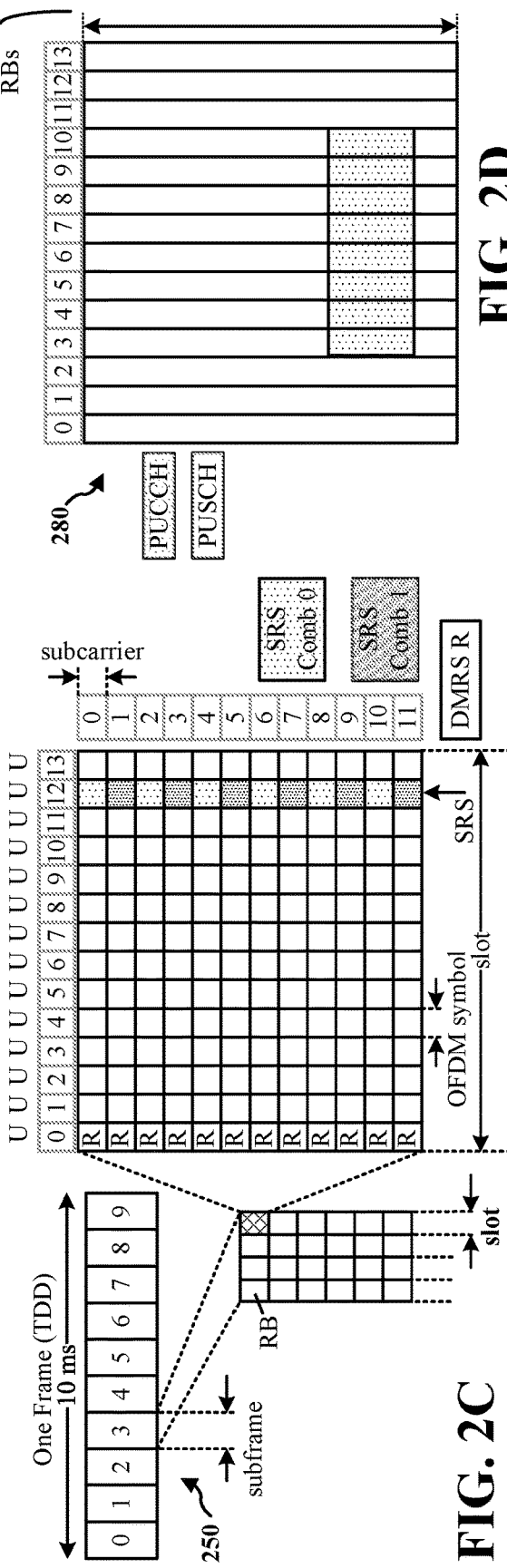
FIG. 2A
FIG. 2B
FIG. 2C
FIG. 2D

MUTUAL AUTHENTICATION FOR RELIABLE CONFIGURATION RECEPTION OVER REFERENCE SIGNALS

TECHNICAL FIELD

The present disclosure relates generally to communication systems, and more particularly, to mutual authentication between a transmitter and a receiver in a configuration sharing process.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a first network node. The apparatus may transmit an authentication proof to a second network node. The authentication proof may be based on a first credential associated with the first network node. The first network node may be authenticable based on the authentication proof. The apparatus may receive a configuration request from the second network node. The configuration request may include a phase-modulated indication of a second credential associated with the second network node. The configuration request may be based on a random phase. The apparatus may transmit a configuration response to the second network node. The configuration response may include a phase-modulated confidential parameter. The configuration response may be based on the configuration request.

In an aspect of the disclosure, a method, a computer-readable medium, and an apparatus are provided. The apparatus may be a second network node. The apparatus may receive an authentication proof from a first network node. The authentication proof may be based on a first credential associated with the first network node. The apparatus may identify whether the first network node is authentic based on the authentication proof. The apparatus may transmit a configuration request to the first network node. The configuration request may include a phase-modulated indication of a second credential associated with the second network node. The configuration request may be based on a random phase. The second network node may be authenticable based on the configuration request. The apparatus may receive a configuration response from the first network node based on the second network node being authenticated. The configuration response may include a phase-modulated confidential parameter. The configuration response may be based on the configuration request.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 2A is a diagram illustrating an example of a first frame, in accordance with various aspects of the present disclosure.

FIG. 2B is a diagram illustrating an example of downlink (DL) channels within a subframe, in accordance with various aspects of the present disclosure.

FIG. 2C is a diagram illustrating an example of a second frame, in accordance with various aspects of the present disclosure.

FIG. 2D is a diagram illustrating an example of uplink (UL) channels within a subframe, in accordance with various aspects of the present disclosure.

DETAILED DESCRIPTION

Figure 1:
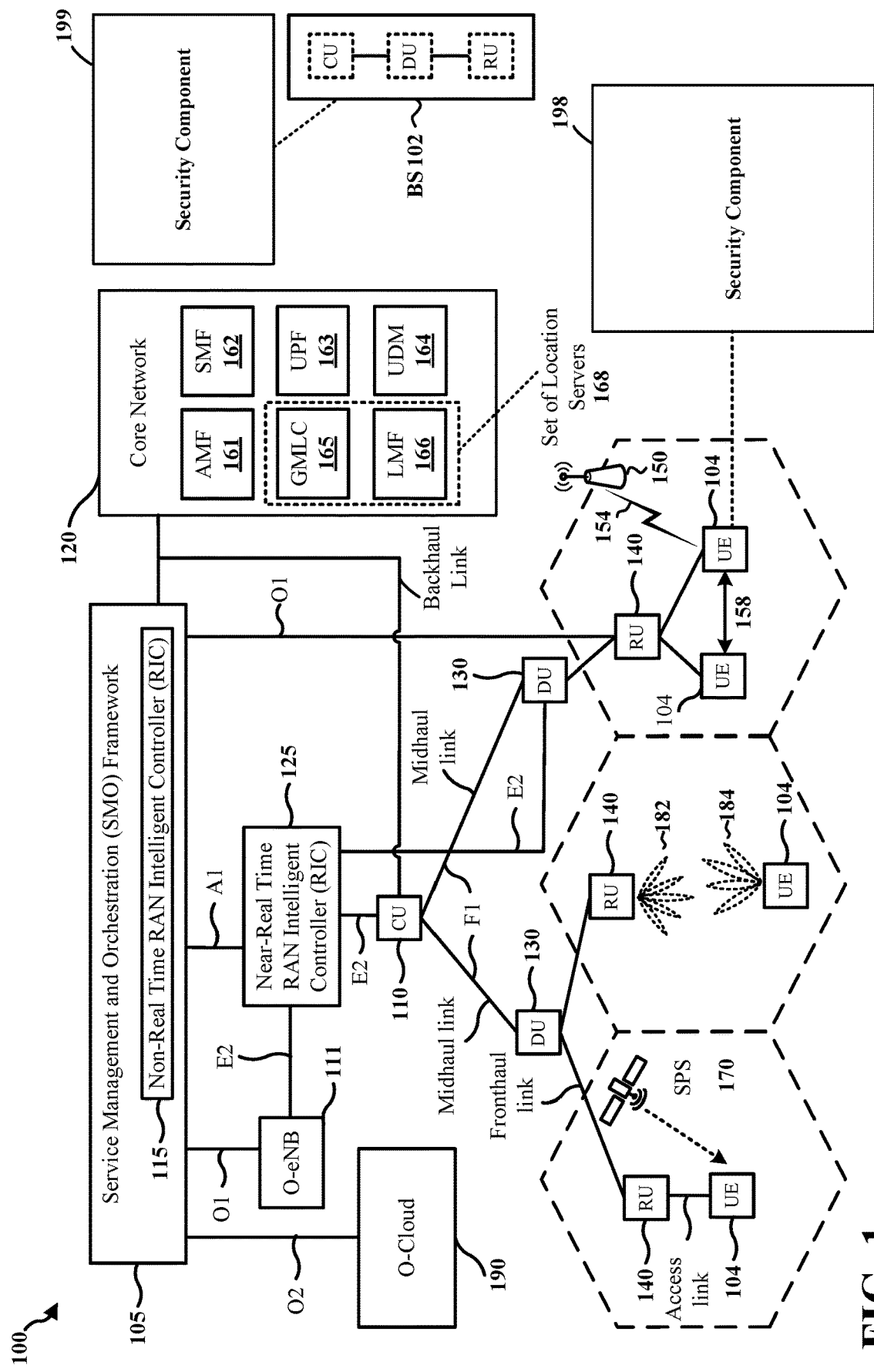
FIG. 1 is a diagram illustrating an example of a wireless communications system and an access network, in accordance with various aspects of the present disclosure.

In some aspects, data confidentiality and integrity in a wireless communication system (e.g., a 5G NR system) may be achieved through upper-layer cryptography. Further, reference signals may be important in many functionalities (e.g., channel estimation, positioning, etc.) in a wireless communication system. Absent security protection for reference signals, transmissions over reference signals may be vulnerable to malicious attacks. Vulnerable reference signals may also impair the reliability of subsequent communication functions.

In some aspects, a legitimate transmitter may share (transmit) a configuration with legitimate receivers securely and reliably over reference signals in the presence of non-legitimate (e.g., malicious or fake) receivers. On the other hand, in some additional aspects described herein, a legitimate receiver may perform a procedure to identify the presence of non-legitimate (e.g., malicious or fake) transmitters so that the transmission of reference signals may be made secure and reliable.

One or more aspects of the disclosure may relate to physical layer (PHY) authentication techniques for secure and reliable configuration reception over reference signals to prevent a fake transmitter from intervening in a legitimate transmit-receive procedure (e.g., the fake transmitter may intervene in the legitimate transmit-receive procedure in an attempt to steal the credentials of the legitimate receiver and/or manipulate the legitimate receiver with a false configuration during configuration sharing over reference signals).

In particular, in one or more aspects, a first network node may transmit an authentication proof to a second network node. The authentication proof may be based on a first credential (a credential may be any suitable information that may be used to verify the identity of a network node) associated with the first network node. The first network node may be authenticable based on the authentication proof. The second network node may identify whether the first network node is authentic based on the authentication proof. The second network node may transmit a configuration request to the first network node. The configuration request may include a phase-modulated indication of a second credential associated with the second network node. The configuration request may be based on a random phase. The second network node may be authenticable based on the configuration request. The first network node may transmit a configuration response to the second network node. The configuration response may include a phase-modulated confidential parameter. The configuration response may be based on the configuration request. Accordingly, in a configuration sharing process, the transmitter (the first network node) and the receiver (the second network node) may be mutually authenticated. As a result, an adversarial device may not be able to manipulate the receiver by transmitting a fake configuration. Further, the transmitter may not transmit the confidential configuration to a fake receiver.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EE- PROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104, when operating as a second (receiving) network node, may include a security component 198 that may be configured to receive an authentication proof from a first network node. The authentication proof may be based on a first credential associated with the first network node. The security component 198 may be configured to identify whether the first network node is authentic based on the authentication proof. The security component 198 may be configured to transmit a configuration request to the first network node. The configuration request may include a phase-modulated indication of a second credential associated with the second network node. The configuration request may be based on a random phase. The second network node may be authenticable based on the configuration request. The security component 198 may be configured to receive a configuration response from the first network node based on the second network node being authenticated. The configuration response may include a phase-modulated confidential parameter. The configuration response may be based on the configuration request. In certain aspects, the base station 102, when operating as a first (transmitting) network node, may include a security component 199 that may be configured to transmit an authentication proof to a second network node. The authentication proof may be based on a first credential associated with the first network node. The first network node may be authenticable based on the authentication proof. The security component 199 may be configured to receive a configuration request from the second network node. The configuration request may include a phase-modulated indication of a second credential associated with the second network node. The configuration request may be based on a random phase. The security component 199 may be configured to transmit a configuration response to the second network node. The configuration response may include a phase-modulated confidential parameter. The configuration response may be based on the configuration request. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

TABLE 1 numerology, SCS, and CP

| $\mu$ | SCS $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu$*15 kHz, where $\mu$ is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIGS. 2A-2D provide an example of normal CP with 14 symbols per slot and numerology $\mu$=2 with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
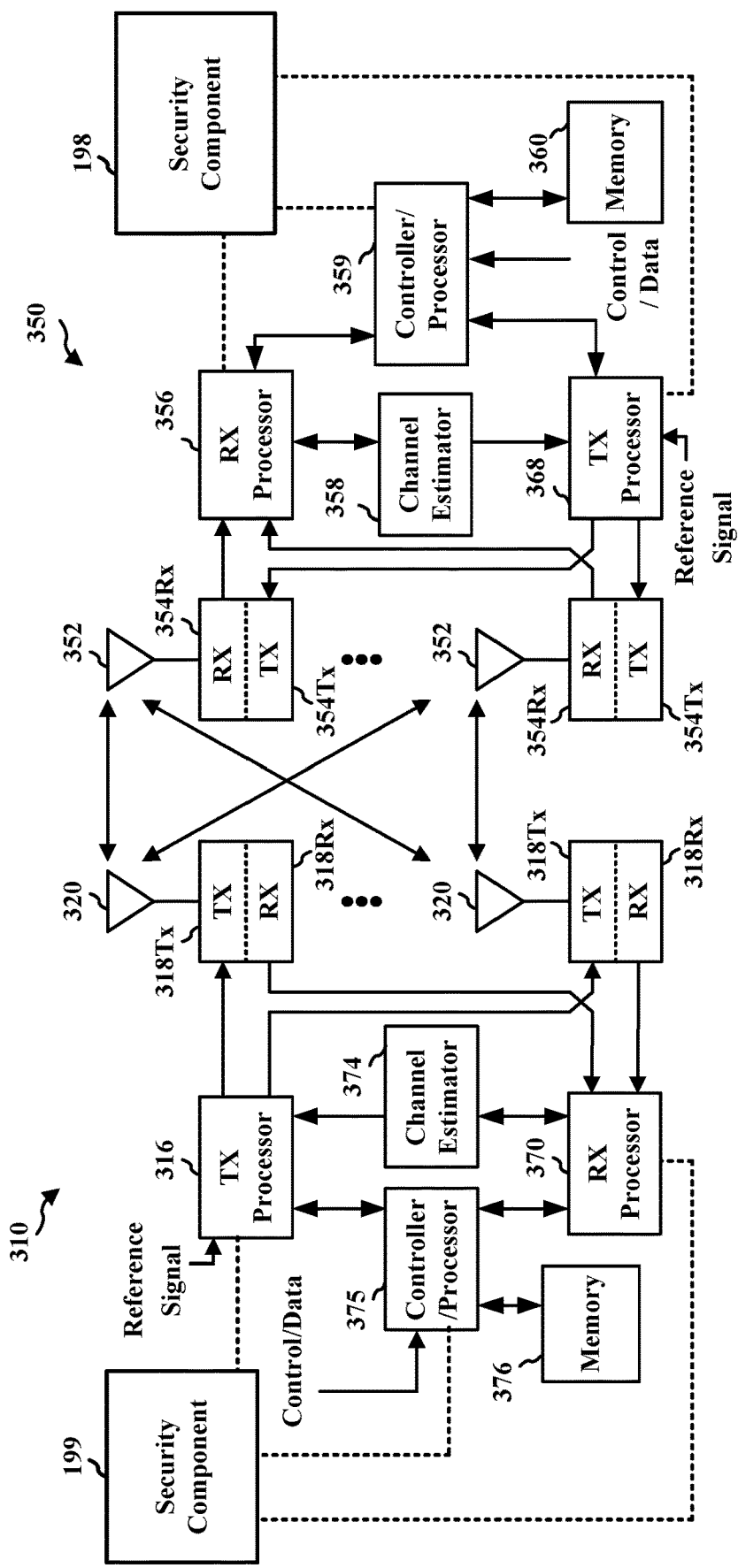
FIG. 3 is a diagram illustrating an example of a base station and user equipment (UE) in an access network, in accordance with various aspects of the present disclosure.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the security component 198 of FIG. 1.

At least one of the TX processor 316, the RX processor 370, and the controller/processor 375 may be configured to perform aspects in connection with the security component 199 of FIG. 1.

In one or more aspects, transmitter may share the configuration that describes parameters of a PHY technique (e.g., for security, reliability, etc.) with the receiver ahead of time (i.e., before executing the PHY technique in future steps). For example, herein a configuration may refer to a set of parameters including all necessary parameters of a PHY technique that aims at security and/or reliability. For example, if the PHY technique is to add an artificial frequency domain residual sideband (FDRSB) impairment, then the associated configuration may provide the respective parameters, e.g., coefficients of the filter taps to create the in-phase (I)/quadrature (Q) mismatch. Transmitting (sharing) the configuration using reference signals directly in PHY may have the benefit of a short response time due to the fast propagation characteristic in PHY.

Figure 4:
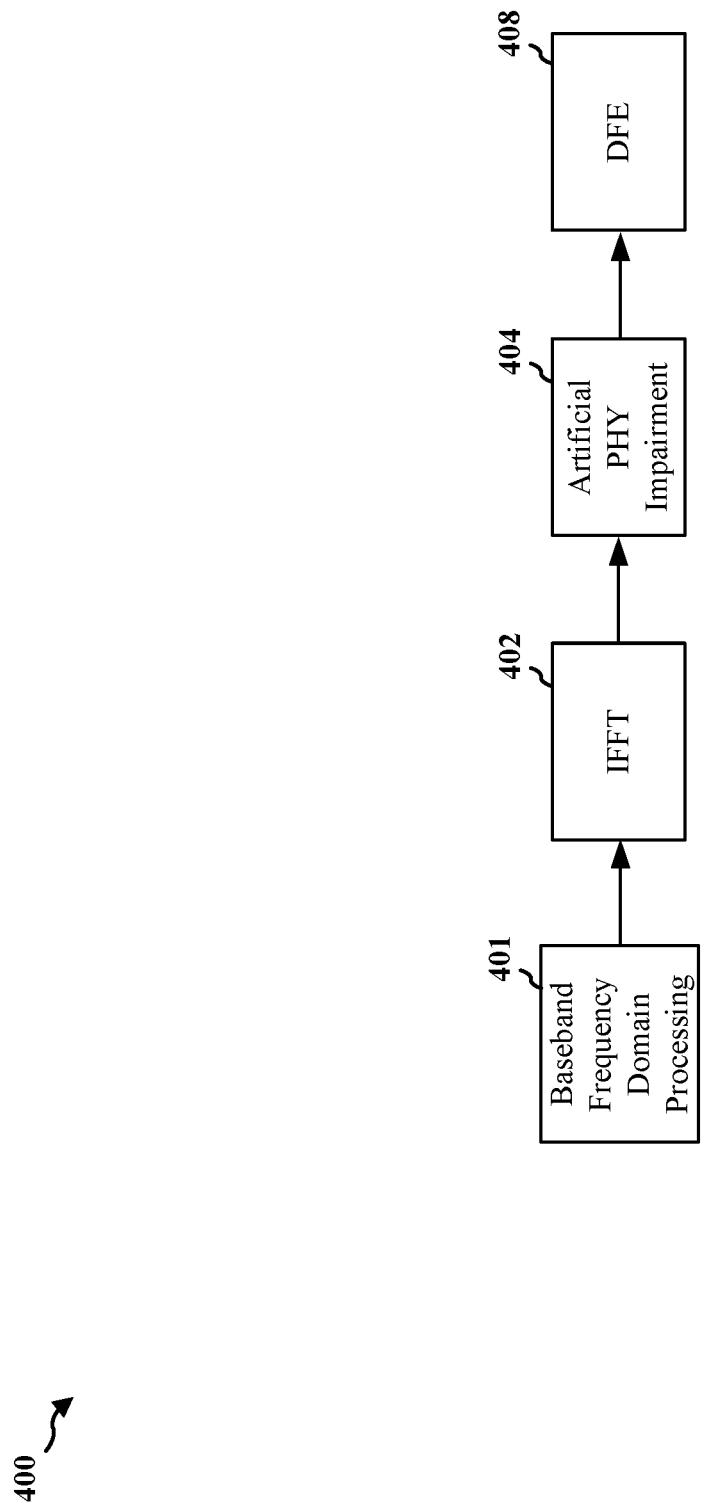
FIG. 4 is an example block diagram illustrating addition of an artificial physical layer (PHY) impairment, in accordance with various aspects of the present disclosure.

FIG. 4 is an example block diagram 400 illustrating addition of an artificial PHY impairment. The artificial PHY impairment (e.g., an amplitude-modulation-to-phase-modulation (AMPM) impairment or an FDRSB impairment) may be a PHY technique as described hereinafter. For example, the artificial PHY impairment may be used as a signature that both authenticates the transmitter and encrypts the transmission. A receiver may receive an indication of the PHY impairment from the transmitter. Based on the indication, the receiver may confirm that a transmission with a PHY impairment consistent with the indication was transmitted by the transmitter. Further, the receiver may recover the content of the transmission by removing the PHY impairment based on the indication. Adding the artificial PHY impairment in the oversampled domain (e.g., the output of the digital front-end (DFE) block 408, also known as the DAC input) may introduce out-of-band leakage, which may lead to a violation of the adjacent channel leakage ratio (ACLR) specification. Accordingly, the artificial PHY impairment may be added in the baseband domain at block 404 between the IFFT block 402 (the IFFT block 402 may receive the output of the baseband frequency domain processing block 401 as the input) and the DFE block 408.

Because the artificial PHY impairment is introduced in the baseband domain, all the impairment may be folded to the in-band, which may be associated with a cost in terms of the error vector magnitude (EVM). Further, the added artificial PHY impairment may be removed at the receiver. However, due to other impairments (e.g., thermal noise, channel noise, etc.) the removal of the artificial PHY impairment at the receiver may not be perfect. In one or more aspects, if the artificial PHY impairment is also added to the at least one data portion of the downlink traffic (e.g., PDSCH and/or PDCCH), a digital post-distortion (DPoD) technique (which may be applied iteratively) may be utilized to improve (e.g., reduce) the EVM associated with the at least one data portion of the downlink traffic.

In one or more aspects, the transmission of the configuration from a legitimate transmitter may be 1) secure directly in PHY (e.g., via phase-difference transmission) such that no adversary capturing the reference signal may be able to learn the configuration, and 2) authentic such that the transmitter may communicate the configuration with just the legitimate receiver.

In one or more further configurations, a legitimate receiver may ensure that the party sharing a configuration is not a fake transmitter (e.g., a fake transmitter may learn/steal the secret credentials of the legitimate receiver and/or manipulate the legitimate receiver with a false/fake configuration to corrupt the reliability of subsequent communication steps.

Therefore, according to one or more aspects described herein, to achieve secure and reliable configuration reception over reference signals, a legitimate receiver may authenticate the transmitter (in addition to the legitimate transmitter authenticating the receiver). In other words, the overall authentication may be mutual, and the legitimate receiver may ensure that its credentials are not captured/stolen by any fake transmitter. Further, the mutual authentication may help the legitimate receiver ensure that it is not manipulated by a fake transmitter with a false configuration.

In one or more aspects, a legitimate receiver may authenticate the transmitter at the beginning of the configuration sharing process (e.g., before a configuration request is sent by the receiver) (e.g., at a first step). The configuration sharing process may refer to the process by which the transmitter may share the configuration associated with the PHY technique to be used with the receiver ahead of the time of the transmission where the PHY technique is actually used. Further, the transmitter may be triggered by the receiver to send the configuration so that the PHY technique may be implemented (e.g., for the receiver to remove an FDRSB impairment, the receiver may need to know the filter taps that the transmitter uses to create the impairment, and the receiver may ask the transmitter to send the configuration associated with the FDRSB impairment). Herein the receiver-provided trigger may be referred to as the configuration request. The legitimate receiver may not continue with sending its own credential (e.g., during a configuration request) if the transmitter fails authentication (i.e., turns out to be a fake transmitter).

Accordingly, the transmitter may send the authentication proof (e.g., a proof that the transmitter may share with the receiver to show that the transmitter is a legitimate transmitter) at the beginning of the configuration sharing process. The authentication proof may include the credentials of the transmitter, where the credentials of the transmitter may be known a priori by the legitimate receiver. In another example, since there may not be a phase difference-based secret sharing step prior to the authentication proof being sent, the credential of the transmitter may be concealed by a uninvertible one-way function (e.g., a hash function) before being sent by the transmitter, in order to prevent the credential of the transmitter from being captured in case of exposure. By using the hashed version of the credential of the transmitter, the credential may not be learned even if the hashed version of the credential is captured by an unintended receiver/intruder due to the use of the uninvertible one-way function. The hashed version of the credential may serve as a proof of the identity of the transmitter for the legitimate receiver as the legitimate receiver may generate, by itself, the hashed version of the credential of the transmitter and may compare the generated version with the received version.

Authenticating the transmitter at the beginning of the configuration sharing process may prevent a fake transmitter from learning the credentials of a legitimate receiver or manipulating the legitimate receiver with a fake configuration. However, the technique may be associated with the cost of 1) higher computational complexity due to the uninvertible one-way function computation directly in PHY, and 2) incorporating pilots to detect the transmitted tag coherently.

In one or more additional configurations, the legitimate receiver may authenticate the transmitter at the end of the configuration sharing process (e.g., after the configuration request/response has been communicated) (e.g., at a last step). The legitimate receiver may discard a configuration if the transmitter of the configuration is not authenticated at the end of the configuration sharing process. Accordingly, manipulation of the legitimate receiver via a fake configuration may be prevented.

Accordingly, the transmitter may send the credentials of the transmitter at the end of the configuration sharing process (e.g., while sharing the configuration). In particular, the transmitter may send the credentials of the transmitter through the phase difference-based secret sharing technique (e.g., using the channel phase response from the previous step). Compared to authenticating the transmitter at the beginning of the configuration sharing process, authenticating the transmitter at the end of the configuration sharing process may be associated with the advantage of much lower computational cost.

Because the transmitter is authenticated at the end of the configuration sharing process, the technique may not prevent a fake transmitter from learning the credentials of a legitimate receiver because the receiver may send its credentials before authenticating the transmitter. Therefore, the legitimate receiver may revoke its own credentials for the purpose of further use if the transmitter cannot be authenticated.

Figure 5:
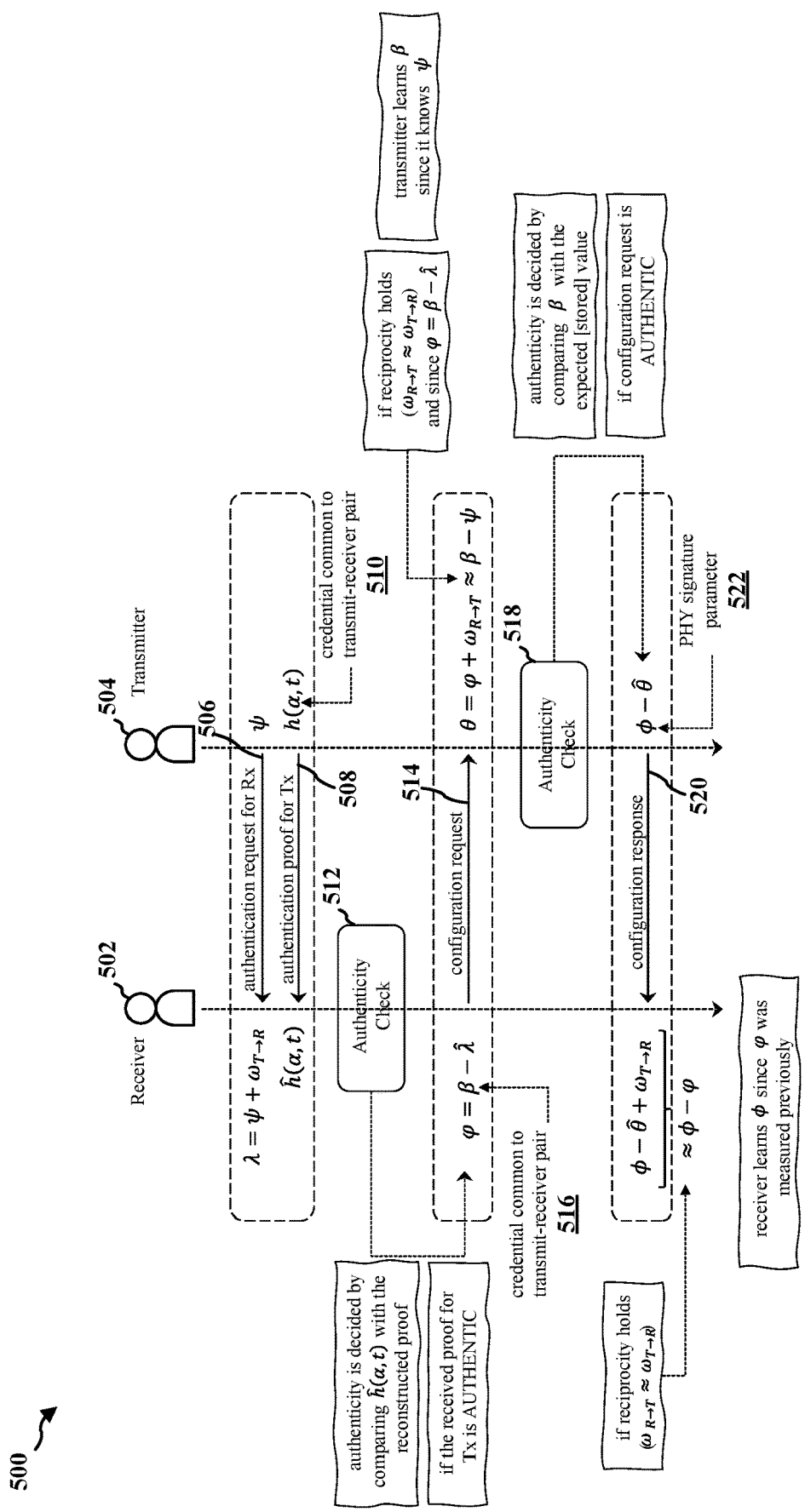
FIG. 5 is a diagram illustrating an example process for secure and reliable configuration sharing according to one or more aspects.

FIG. 5 is a diagram illustrating an example process 500 for secure and reliable configuration sharing according to one or more aspects. The legitimate receiver 502 and the legitimate transmitter 504 may be referred to simply as the receiver 502 and the transmitter 504. Although in some aspects herein the receiver 502 may correspond to a UE (e.g., a UE 104) and the transmitter 504 may correspond to a base station (e.g., a base station 102), the disclosure is not so limited. In different configurations, the receiver 502 and the transmitter 504 may correspond to network nodes of any suitable types, as appropriate.

As shown, at 506, the transmitter 504 may send an authentication request to the receiver 502. The authentication request 506 may include a random phase $\psi$ (e.g., an arbitrary phase between 0 and 360 degrees). In some aspects, the phase $\psi$ may be known to the transmitter 504 but not to the receiver 502. In one or more aspects, a new phase value $\psi$ may be selected by the transmitter 504 each time a new authentication request is sent at 506 (e.g., to prevent the replay attack, that is, to prevent an adversarial device from recording the authentication response to deceive the receiver 502 later on). Further, in one or more aspects, the transmitter 504 may use a different beam each time the transmitter 504 sends a new authentication request at 506. In particular, the transmitter 504 may choose the beam randomly (e.g., also to prevent the replay attack).

At 508, the transmitter 504 may send an authentication tag (also referred to as the authentication proof of the transmitter 504) $h(\alpha, t)$ to the receiver 502, where $\alpha$ 510 may be the credentials of the transmitter 504 and t may be a time index (e.g., a sequence number—to prevent replay attacks). In particular, $\alpha$ 510 may be known (a priori) by the receiver 502.

In one or more aspects, the authentication tag/proof 508 may be generated using an uninvertible one-way function (e.g., a hash function) $h(\cdot)$ to conceal the content lest the authentication tag/proof 508 be captured by an adversarial device. Because $h(\cdot)$ is an uninvertible one-way function, an adversarial device may not learn the content (i.e., the input to $h(\cdot)$) of $h(\cdot)$ even if the authentication tag/proof 508 is captured by an adversarial device.

The receiver 502 may obtain the estimate of the received authentication tag as $\hat{h}(\alpha, t)$, which may be performed in a coherent fashion by employing additional pilot resources used to estimate the channel first (the fashion in which the received authentication tag is estimated may be referred to as coherent because the channel estimate is utilized). Then, to perform the authenticity check 512 to authenticate the transmitter 504, the receiver 502 may compare the estimate $\hat{h}(\alpha, t)$ against a reconstructed version of $h(\alpha, t)$ (as $\alpha$ 510 is available to the receiver 502 and t is tracked by the receiver 502, the receiver 502 may reconstruct a version of $h(\alpha, t)$ on its own). In one or more aspects, to decide, at 512, on the legitimacy of the transmitter 504, the comparison may be based on a distribution-based hypothesis test and/or a Hamming-distance-based similarity test. Thereafter, the receiver 502 may continue with sending its own credentials if the transmitter 504 is confirmed as legitimate based on the authenticity check 512. Otherwise, if the transmitter cannot be authenticated, the receiver 502 may stop participating in the configuration sharing process.

In one or more aspects, the random phase $\psi$ and the authentication tag $h(\alpha, t)$ may be transmitted simultaneously by the transmitter 504 on different subcarriers. In additional configurations, the random phase $\psi$ and the authentication tag $h(\alpha, t)$ may be transmitted using adjacent time-frequency resources so that the receiver 502 may correlate the two transmissions at 505 and 508 assume both are coming from the same source (i.e., the transmitter 504).

As a response to sending $\psi$ by the transmitter 504 at 506, the phase output of the channel at the receiver 502 may become $\lambda = \psi + \omega_{T \to R}$, where $\omega_{T \to R}$ may be the phase rotation due to the RF front-end and (propagation over) the channel. The receiver 502 may measure $\lambda$ as $\hat{\lambda}$. Accordingly, the receiver 502 may prepare the authentication response including the phase value $\varphi = \beta - \hat{\lambda}$, where $\beta$ 516 may be the phase-modulated credential of the receiver 502 known also by the transmitter 504. The phase $\beta$ 516 representing the credential of the receiver 502 may be independent from the credential $\alpha$ 510. At 514, the receiver 502 may send the phase value $\varphi$ back to the transmitter 504.

Even if an adversarial device is able to measure the transmitted phase $\varphi = \beta - \hat{\lambda}$, the adversarial device may not learn the phase $\beta$ 516 representing the credential of the receiver 502 because the adversarial device may not know $\hat{\lambda}$ ($\hat{\lambda}$ is the value measured at the receiver 502 but not at other devices). Therefore, the authentication response included in the configuration request 514 may be PHY-secure.

The respective phase for the configuration request 514 at the transmitter 504 may be $\theta = \varphi + \omega_{R \to T}$, which may be equivalent to $\beta - \psi$ due to channel reciprocity between the authentication request 506 and the authentication response/configuration request 514 (i.e., $\psi_{R \to T} \approx \omega_{T \to R}$) and the fact that $\varphi = \beta - \hat{\lambda}$.

The transmitter 504 may measure the received phase as $\hat{\theta} \approx \beta - \psi$. Because the initial random phase $\psi$ is known to the transmitter 504, the transmitter 504 may readily obtain the phase $\beta$ 516 representing the credential of the receiver 502 from the authentication response/configuration request 514. Further, because $\beta$ 516 is known a priori to the transmitter 504, the transmitter 504 may perform the authenticity check 518 by comparing the $\beta$ obtained from the phase output against the known/expected $\beta$. In particular, the authenticity check 518 may be based on an authentication test (e.g., a distribution-based hypothesis test, a Hamming distance-based similarity test, etc.) to determine whether the received credential $\beta$ matches the known/expected credential $\beta$. If the received phase $\beta$ 516 passes the authentication test, the receiver 502 may be authenticated to the transmitter 504. Accordingly, the transmitter 504 may then start the procedure to transmit the configuration. Otherwise, if the receiver is not authenticated, the transmitter 504 may stop participating in the process.

If the authentication (i.e., the authenticity check at 518) completes successfully, at 520, the transmitter 504 may send the confidential configuration to the authenticated receiver 502 in a PHY-secure fashion (e.g., using a phase difference-based technique). Therefore, the transmitter 504 may treat the authentication response at 514 as the configuration request, and may prepare the configuration response 520 to include the configuration represented by a phase-modulated parameter $\phi$. The configuration response 520 may be transmitted by the transmitter 504 in response to a configuration request, and may include the requested configuration. The transmitter 504 may then construct the configuration response 520 based on the phase value $\phi - \hat{\theta}$, where $\hat{\theta}$ 522 may be the phase estimate of the channel output for the configuration request. Even if the phase $\phi - \hat{\theta}$ is measured by an adversarial device, the adversarial device may not learn the phase $\phi$ 522 because the adversarial device may not know $\hat{\theta}$. As a result, the adversarial device may not learn the confidential configuration data represented by the phase $\phi$ 522. Therefore, the configuration response 520 may be PHY-secure.

The respective phase for the configuration response 520 at the receiver 502 may then become $\phi - \hat{\theta} + \omega_{T \to R}$, which similarly may be equivalent to $\phi - \varphi$ due to channel reciprocity (i.e., $\omega_{R \to T} \approx \omega_{T \to R}$) and the fact that $\theta = \varphi + \omega_{R \to T}$.

The estimate of the residual phase $\phi - \varphi$ may then be exploited by the receiver 502 to learn the configuration via the related parameter $\phi$ (e.g., $\phi$ 522) because $\varphi$ is already known to the receiver 502 (the receiver may construct $\varphi = \beta - \hat{\lambda}$ while forming authentication response/configuration request 514).

In one or more aspects, the phase parameters $\beta$ and $\phi$ (e.g., ($\beta$ 516 and $\phi$ 522) each may be likely to be multiple bits long. Accordingly, multiple tones may be used in the frequency domain to transmit each of the phase parameters $\beta$ and $\phi$ (e.g., $\beta$ 516 and $\phi$ 522) during the transmissions of the configuration request 514 and the configuration response 520, respectively.

In one example, the random phase $\psi$ and authentication tag/proof $h(\alpha, t)$ may be transmitted by the transmitter 504 simultaneously (e.g., on different subcarriers of an OFDM symbol). In one or more aspects, the receiver 502 may assume that the OFDM symbol carrying a valid h($\alpha$, t) is coming from a legitimate transmitter, and therefore may use the phase measured at subcarriers (of the same OFDM symbol) corresponding to $\psi$ when constructing configuration request 514.

In a different example, the phase $\psi$ and authentication tag/proof h($\alpha$, t) may be transmitted by the transmitter 504 in adjacent time or frequency. Accordingly, the receiver 502 may correlate (tie) the two transmissions (e.g., based on the locations of the time-frequency resources) to make sure that both are coming from the same transmitter. Therefore, in one configuration, the transmitter 504 may produce the authentication tag/proof as h($\alpha$, t, $\psi$) (i.e., the authentication tag/proof may be based on $\psi$ as well). Further, the receiver 502 may obtain or estimate $\psi$. Accordingly, the receiver 502 may produce the authentication response/configuration request 514 corresponding to $\psi$ if the authentication tag/proof h($\alpha$, t, $\psi$) transmitted by the transmitter 504 in another time-frequency resource (e.g., an adjacent resource) is valid (i.e., if the transmitter 504 is authenticated). Therefore, the time-frequency resources used to transmit $\psi$ at 506 and h($\alpha$, t, $\psi$) at 508 may be correlated (tied). Therefore, the transmitter 504 may allocate additional subcarriers (along with the subcarriers carrying $\psi$) to send pilot symbols to help the receiver 502 estimate first the channel and then $\psi$. Based on the estimated $\psi$, the receiver 502 may then locally generate a version of the authentication proof h($\alpha$, t, $\psi$), and may perform the authentication test at 512. The receiver 502 may generate the authentication response/configuration request 514 using the phase response associated with $\psi$ if authentication at 512 is valid (i.e., if the transmitter 504 is authenticated).

In one or more aspects, because the randomness of the authentication proof h($\alpha$, t, $\psi$) may be well provided by $\psi$, the time dependency may be dropped without exposing the receiver 502 to a replay attack. In other words, at 508, h($\alpha$, $\psi$) may be used without exposing the receiver 502 to replay attacks.

Figure 6:
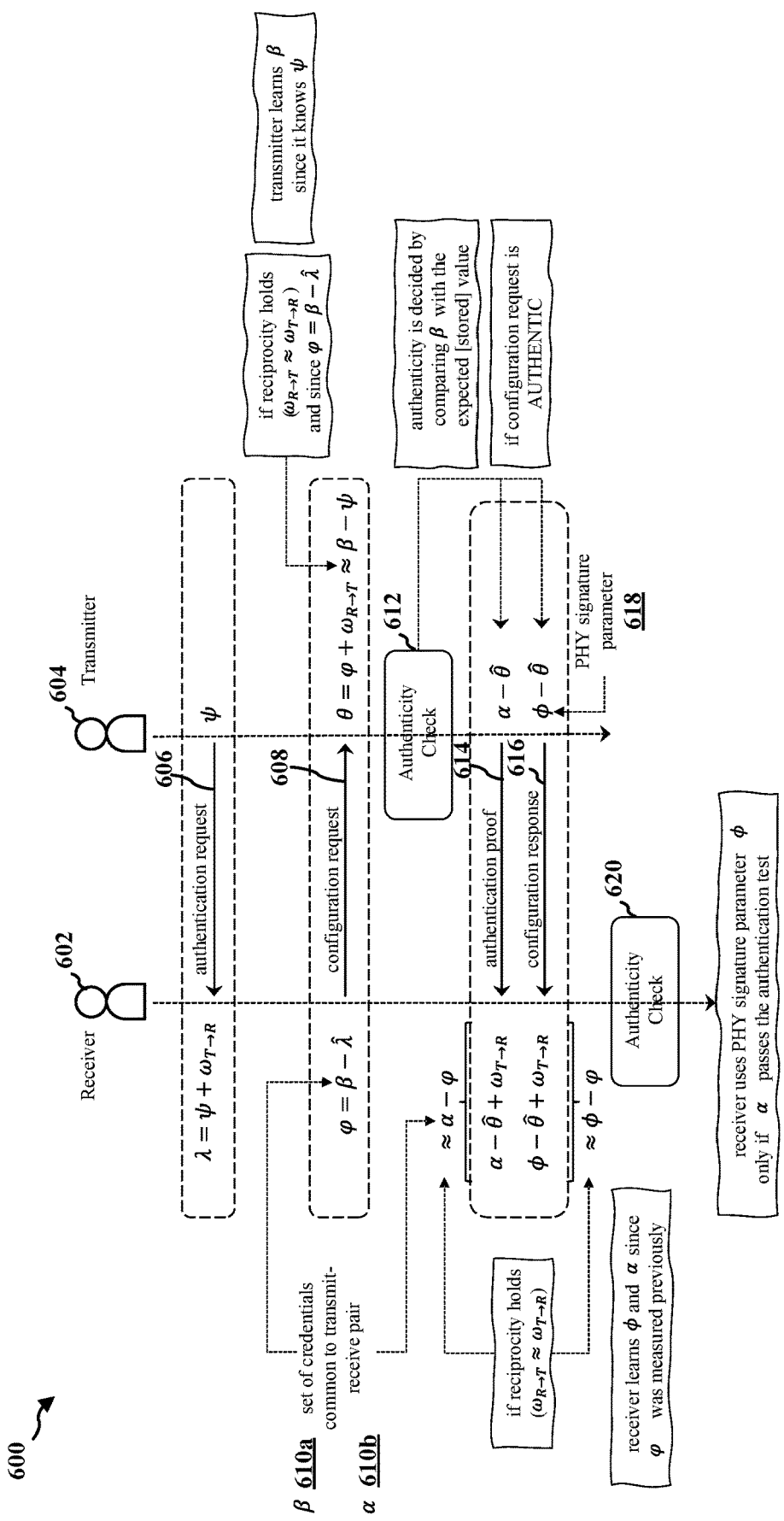
FIG. 6 is a diagram illustrating an example process for secure and reliable configuration sharing according to one or more aspects.

FIG. 6 is a diagram illustrating an example process 600 for secure and reliable configuration sharing according to one or more aspects. The legitimate receiver 602 and the legitimate transmitter 604 may be referred to simply as the receiver 602 and the transmitter 604. Although in some aspects herein the receiver 602 may correspond to a UE (e.g., a UE 104) and the transmitter 604 may correspond to a base station (e.g., a base station 102), the disclosure is not so limited. In different configurations, the receiver 602 and the transmitter 604 may correspond to network nodes of any suitable types, as appropriate.

At 606, the transmitter 504 may send an authentication request to the receiver 602. The authentication request 606 may include a random phase $\psi$. In one or more aspects, the phase $\psi$ may be known to the transmitter 604 but not to other devices. In one or more aspects, a new phase value $\psi$ may be selected by the transmitter 604 each time a new authentication request is sent at 606 (e.g., to prevent the replay attack, that is, to prevent an adversarial device from recording the authentication response to deceive the receiver 602 later on). Further, in one or more aspects, the transmitter 604 may use a different beam each time the transmitter 604 sends a new authentication request at 606. In particular, the transmitter 604 may choose the beam randomly (e.g., also to prevent the replay attack).

As a response to sending $\psi$ by the transmitter 604, the phase output of the channel at the receiver 602 may become $\lambda = \psi + \omega_{T \to R}$, where $\omega_{T \to R}$ may be the phase rotation due to the RF front-end and (propagation over) the channel, The receiver 602 may measure $\lambda$ as $\hat{\lambda}$.

Accordingly, the receiver 602 may prepare the authentication response including the phase value $\varphi = \beta - \hat{\lambda}$, where $\beta$ 610a may be the phase-modulated credential of the receiver 602 known also by the transmitter 604. The phase $\beta$ 610a representing the credential of the receiver 602 may be independent from the credential $\alpha$ 610b. At 608, the receiver 602 may send the phase value $\varphi$ back to the transmitter 604.

Even if an adversarial device is able to measure the transmitted phase $\varphi = \beta - \hat{\lambda}$, the adversarial device may not learn the phase $\beta$ 610a representing the credential of the receiver 602 because the adversarial device may not know $\hat{\lambda}$ ($\hat{\lambda}$ is the value measured at the receiver 602 but not at other devices). Therefore, the authentication response included in the configuration request 608 may be PHY-secure.

The respective phase for the configuration request 608 at the transmitter 604 may be $\theta = \varphi + \omega_{R \to T}$, which may be equivalent to $\beta - \psi$ due to channel reciprocity between the authentication request 606 and the configuration request 608 (i.e., $\omega_{R \to T} \approx \omega_{T \to R}$) and the fact that $\varphi = \beta - \hat{\lambda}$.

The transmitter 604 may measure the received phase as $\hat{\theta} \approx \beta - \psi$. Because the initial random phase $\psi$ is known to the transmitter 604, the transmitter 604 may readily obtain the phase $\beta$ 610a representing the credential of the receiver 602 from the configuration request 608. Further, because $\beta$ 610a is known a priori to the transmitter 604, the transmitter 604 may perform the authenticity check 612 by comparing the $\beta$ obtained from the phase output against the known/expected $\beta$. In particular, the authenticity check 612 may be based on an authentication test (e.g., a distribution-based hypothesis test, a Hamming distance-based similarity test, etc.) to determine whether the received credential $\beta$ matches the known/expected credential $\beta$. If the received phase $\beta$ 610a passes the authentication test, the receiver 602 may be authenticated to the transmitter 604. Accordingly, the transmitter 604 may then start the procedure to transmit the configuration. Otherwise, if the receiver is not authenticated, the transmitter 604 may stop participating in the process.

If the authentication (i.e., the authenticity check at 612) completes successfully, the transmitter 604 may send the authentication proof 614 and the configuration response 616 including the confidential configuration to the authenticated receiver 602 both in a PHY-secure fashion (e.g., using a phase difference-based technique).

The authentication proof 614 may include credentials of the transmitter 604. In particular, the credential of the transmitter 604 may be represented by the phase-modulated credential $\alpha$ 610b in the authentication proof 614. Further, the configuration response 616 may include the configuration represented by a phase-modulated parameter $\phi$ 618.

The transmitter 604 may construct the authentication proof 614 and the configuration response 616 based on phase values $\alpha - \hat{\theta}$ and $\phi - \hat{\theta}$, respectively, where $\hat{\theta}$ may be the phase estimate of the channel output associated with the configuration request 608. Even if either of $\alpha - \hat{\theta}$ or $\phi - \hat{\theta}$ is measured by an adversarial device, the adversarial device may not be able to learn the concealed phases $\alpha$ or $\phi$ (e.g., $\alpha$ 610b or $\phi$ 618) because the adversarial device may not know $\hat{\theta}$. Therefore, the authentication proof 614 and the configuration response 616 may be communicated in a PHY-secure fashion.

The respective phase outputs for the authentication proof 614 and the configuration response 616 at the receiver 602 may become $\alpha - \hat{\theta} + \omega_{T \to R}$ and $\phi - \hat{\theta} + \omega_{T \to R}$, respectively, which may be equivalent to $\alpha - \varphi$ and $\phi - \varphi$, respectively, due to channel reciprocity (i.e., $\omega_{R \to T} \approx \omega_{T \to R}$) and the fact that $\theta = \varphi + \omega_{R \to T}$. Because $\varphi$ is already available to the receiver 602 (the receiver 602 may construct $\varphi = \beta - \hat{\lambda}$ when forming the configuration request 608), noisy estimates of both $\alpha$ 610b and $\phi$ 618 may become available to the receiver 602. Further, because $\alpha$ 610b is known a priori to the receiver 602, the receiver 602 may perform the authenticity check 620 by comparing the $\alpha$ obtained from the phase output against the known/expected $\alpha$. In particular, the authenticity check 620 may be based on an authentication test (e.g., a distribution-based hypothesis test, a Hamming distance-based similarity test, etc.) to determine whether the received credential $\alpha$ matches the known/expected credential $\alpha$. If the received credential $\alpha$ 610b passes the authentication test at 620, the receiver 602 may then conclude the legitimacy of the transmitter 604, and may continue with learning/using the configuration (e.g., the parameter represented by $\phi$ 618). Otherwise, if the transmitter is not authenticated, the receiver 602 may discard the received configuration.

In one or more aspects, the phase parameters $\alpha$, $\beta$, and $\phi$ (e.g., $\alpha$ 610b, $\beta$ 610a and $\phi$ 618) each may be likely to be multiple bits long. Accordingly, multiple tones may be used in the frequency domain to transmit each of the phase parameters $\alpha$, $\beta$, and $\phi$ (e.g., $\alpha$ 610b, $\beta$ 610a and $\phi$ 618) during the transmissions of the authentication proof 614, the configuration request 608, and the configuration response 616, respectively.

In some aspects, the transmitter 504/604 may include (e.g., append) a cyclic redundancy check (CRC) in the phase parameter $\phi$ (e.g., $\phi$ 522/618) (e.g., using frequency domain resource blocks) to enable the receiver 502/602 to verify the accuracy of the received phase $\phi$ 522/618 and hence the configuration. If the receiver 502/602 identifies a received phase $\phi$ 522/618 as inaccurate based on the CRC, the receiver 502/602 may transmit a negative acknowledgement (NACK) to the transmitter 504/604. Accordingly, in some aspects, if the transmitter 504/604 does not receive a NACK (e.g., within a time window after a transmission), the transmitter 504/604 may assume that the receiver 502/602 has learned the configuration correctly.

If the transmitter 504/604 receives a NACK, in one configuration, the transmitter 504/604 may try resharing the configuration following the same procedure as described above. In another configuration, if the transmitter 504/604 receives a NACK, the transmitter 504/604 may suspend the configuration sharing process for a preconfigured time period. In some aspects, if the suspension time period is longer than a network-selected authentication lifetime or the channel coherence time, the authentication procedure may also be repeated prior to the resumption of configuration transmission.

Due to imperfections in channel reciprocity and phase estimation, the measured $\beta-\psi$, $\alpha-\varphi$, and $\phi-\varphi$ may be inaccurate/erroneous (i.e., deviate from correct values). Accordingly, to reduce negative effects of the deviation, in some aspects, the transmit-receive pair (e.g., the transmitter 504/604-receiver 502/602 pair) may (periodically or from time to time) exchange known phase parameters $\beta$, $\alpha$, and $\phi$ to measure and quantify the errors between the received and the expected/correct values of $\beta-\psi$, $\alpha-\varphi$, and $\phi-\varphi$ ($\psi$ and $\varphi$ are used because $\psi$ and $\varphi$ are available to respective related devices/parties).

In some aspects, the network may (dynamically or statically) set thresholds for the errors associated with $\beta-\psi$, $\alpha-\varphi$, and $\phi-\varphi$, as described above, based on whether the transmitted data is known or not known to the receiver 502/602. In some aspects, different thresholds may be set for the errors associated with $\beta-\psi$, $\alpha-\varphi$, and $\phi-\varphi$. In some aspects, if the error measurements for $\beta-\psi$, $\alpha-\varphi$, and $\phi-\varphi$ are all below their respective thresholds, the phase difference-based configuration sharing process as illustrated in FIGS. 5 and 6 may be allowed. On the other hand, if at least one of the error measurements for $\beta-\psi$, $\alpha-\varphi$, and $\phi-\varphi$ is below its respective threshold, the phase difference-based configuration sharing process may be suspended until at least the phase errors are measured the next time.

Figure 7:
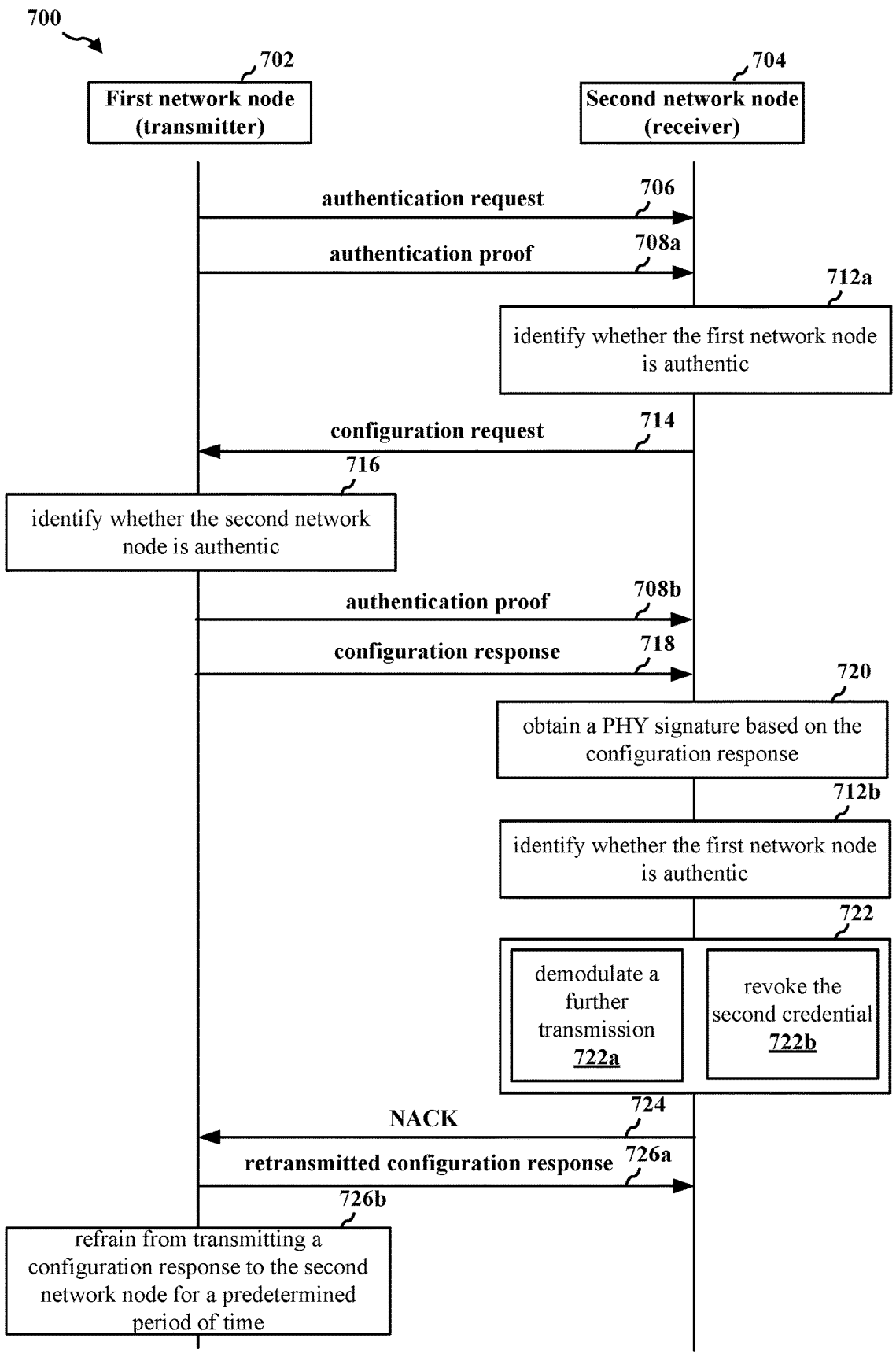
FIG. 7 is a diagram of a communication flow of a method of wireless communication, in accordance with various aspects of the present disclosure.

FIG. 7 is a diagram of a communication flow 700 of a method of wireless communication. As shown, the first network node 702 may correspond to the transmitter 504/604 and the second network node 704 may correspond to the receiver 502/602. At 706, the first network node 702 may transmit an authentication request to the second network node 704. The authentication request may include the random phase.

In one configuration, the authentication request 706 may be associated with a randomly selected beam.

At 708a or 708b, the first network node 702 may transmit an authentication proof to a second network node 704. The authentication proof may be based on a first credential associated with the first network node 702. The first network node 702 may be authenticable based on the authentication proof.

At 712a or 712b, the second network node 704 may identify whether the first network node 702 is authentic based on the authentication proof 708a or 708b.

In one configuration, the first network node 702 may be authenticable based on a distribution-based hypothesis test or a Hamming distance-based similarity test.

At 714, the second network node 704 may transmit a configuration request to the first network node 702. The configuration request may include a phase-modulated indication (i.e., a representation of (binary) data in terms of phases) of a second credential associated with the second network node 704. The configuration request may be based on the random phase. The second network node 704 may be authenticable based on the configuration request.

In one configuration, the authentication proof 708a may be transmitted by the first network node 702 to the second network node 704 prior to the configuration request 714 being received by the first network node 702 from the second network node 704. The configuration request 714 may be received by the first network node 702 from the second network node 704 based on the first network node 702 being authenticated based on the authentication proof 708a.

In one configuration, the authentication proof 708a may be further based on a time index and an uninvertible one-way function.

In one configuration, the authentication request 706 and the authentication proof 708a may be transmitted simultaneously and via different subcarriers.

In one configuration, the authentication request 706 and the authentication proof 708a may be transmitted via adjacent time-frequency resources. The authentication proof 708a may be further based on the random phase and a one-way hash function.

In one configuration, the authentication proof 708b may be transmitted by the first network node 702 to the second network node 704 after the configuration request 714 is received by the first network node 702 from the second network node 704.

In one configuration, the authentication proof 708b may be further based on the configuration request 714.

In one configuration, the authentication proof 708*b* may be associated with a plurality of tones.

In one configuration, the configuration request 714 and the configuration response 718 may be each associated with a plurality of tones.

In one configuration, a first transmission from the first network node 702 to the second network node 704 may be subjected to a first phase rotation (e.g., an overall phase rotation) associated with the first transmission that is reciprocal to a second phase rotation (e.g., an overall phase rotation) associated with a second transmission from the second network node 704 to the first network node 702. The second transmission may be subjected to the second phase rotation.

At 716, the first network node 702 may identify whether the second network node 704 is authentic based on the configuration request 714.

In one configuration, whether the second network node 704 is authentic may be identified based on a distribution-based hypothesis test or a Hamming distance-based similarity test.

At 718, the first network node 702 may transmit a configuration response to the second network node 704. The configuration response may include a phase-modulated confidential parameter (i.e., the confidential parameter may be represented in terms of phases) (the confidential parameter may include, e.g., parameters of the PHY technique). The configuration response may be based on the configuration request 714. The configuration response may be transmitted to the second network node 704 if the second network node 704 is identified as being authentic.

At 720, the second network node 704 may obtain a PHY signature based on the configuration response 718.

At 722, the second network node 704 may perform 722*a* or 722*b*. At 722*a*, the second network node 704 may demodulate a further transmission from the first network node 702 based on the PHY signature if the first network node 702 is identified as being authentic.

At 722*b*, the second network node 704 may revoke the second credential associated with the second network node 704 if the first network node 702 is identified as being not authentic based on the authentication proof 708*b*.

At 724, the first network node 702 may receive a NACK from the second network node 704 based on a CRC.

At 726*a*, in response to the NACK, the first network node 702 may retransmit the configuration response to the second network node 704.

At 726*b*, in response to the NACK, the first network node 702 may refrain from transmitting a configuration response to the second network node 704 for a predetermined period of time.

Figure 8:
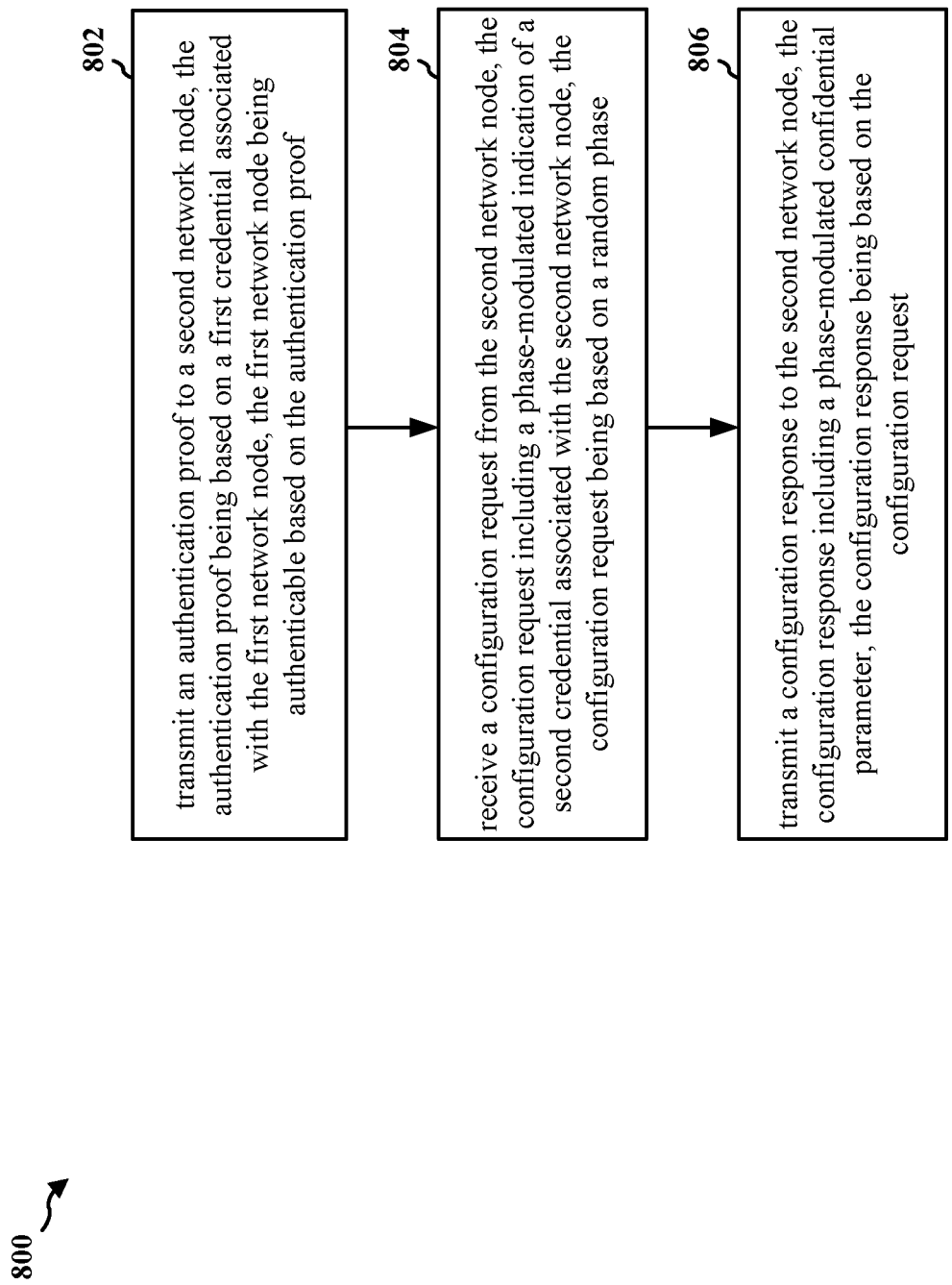
FIG. 8 is a flowchart of a method of wireless communication, in accordance with various aspects of the present disclosure.

FIG. 8 is a flowchart 800 of a method of wireless communication. The method may be performed by a base station or a first (transmitting) network node (e.g., the base station 102/310; the transmitter 504/604; the first network node 702; the network entity 1202). At 802, the first network node may transmit an authentication proof to a second network node. The authentication proof may be based on a first credential associated with the first network node. The first network node may be authenticable based on the authentication proof. For example, 802 may be performed by the component 199 in FIG. 13. Referring to FIG. 7, at 708*a* or 708*b*, the first network node 702 may transmit an authentication proof to a second network node 704.

At 804, the first network node may receive a configuration request from the second network node. The configuration request may include a phase-modulated indication of a second credential associated with the second network node. The configuration request may be based on a random phase. For example, 804 may be performed by the component 199 in FIG. 13. Referring to FIG. 7, at 714, the first network node 702 may receive a configuration request from the second network node 704.

At 806, the first network node may transmit a configuration response to the second network node. The configuration response may include a phase-modulated confidential parameter. The configuration response may be based on the configuration request. For example, 806 may be performed by the component 199 in FIG. 13. Referring to FIG. 7, at 718, the first network node 702 may transmit a configuration response to the second network node 704.

Figure 9:
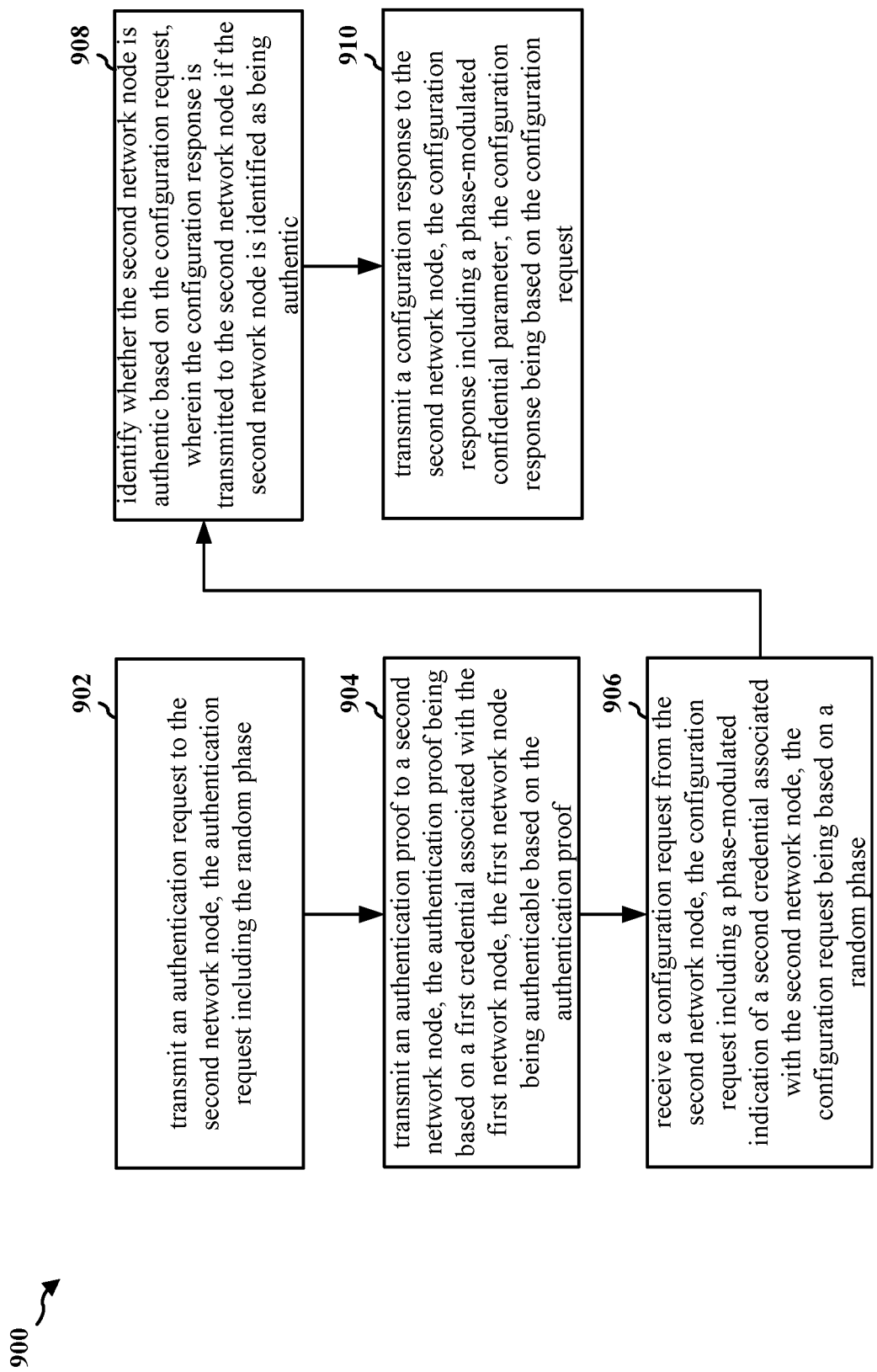
FIG. 9 is a flowchart of a method of wireless communication, in accordance with various aspects of the present disclosure.

FIG. 9 is a flowchart 900 of a method of wireless communication. The method may be performed by a base station or a first (transmitting) network node (e.g., the base station 102/310; the transmitter 504/604; the first network node 702; the network entity 1202). At 904, the first network node may transmit an authentication proof to a second network node. The authentication proof may be based on a first credential associated with the first network node. The first network node may be authenticable based on the authentication proof. For example, 904 may be performed by the component 199 in FIG. 13. Referring to FIG. 7, at 708*a* or 708*b*, the first network node 702 may transmit an authentication proof to a second network node 704.

At 906, the first network node may receive a configuration request from the second network node. The configuration request may include a phase-modulated indication of a second credential associated with the second network node. The configuration request may be based on a random phase. For example, 906 may be performed by the component 199 in FIG. 13. Referring to FIG. 7, at 714, the first network node 702 may receive a configuration request from the second network node 704.

At 910, the first network node may transmit a configuration response to the second network node. The configuration response may include a phase-modulated confidential parameter. The configuration response may be based on the configuration request. For example, 910 may be performed by the component 199 in FIG. 13. Referring to FIG. 7, at 718, the first network node 702 may transmit a configuration response to the second network node 704.

In one configuration, at 902, the first network node may transmit an authentication request to the second network node. The authentication request may include the random phase. For example, 902 may be performed by the component 199 in FIG. 13. Referring to FIG. 7, at 706, the first network node 702 may transmit an authentication request to the second network node 704.

At 908, the first network node may identify whether the second network node is authentic based on the configuration request. The configuration response may be transmitted to the second network node if the second network node is identified as being authentic. For example, 908 may be performed by the component 199 in FIG. 13. Referring to FIG. 7, at 716, the first network node 702 may identify whether the second network node 704 is authentic based on the configuration request 714.

In one configuration, referring to FIG. 7, the authentication request 706 may be associated with a randomly selected beam.

In one configuration, referring to FIG. 7, whether the second network node 704 is authentic may be identified, at 716, based on a distribution-based hypothesis test or a Hamming distance-based similarity test.

In one configuration, referring to FIG. 7, the authentication proof 708a may be transmitted to the second network node 704 prior to the configuration request 714 being received from the second network node 704. The configuration request 714 may be received from the second network node 704 based on the first network node 702 being authenticated based on the authentication proof 708a.

In one configuration, referring to FIG. 7, the authentication proof 708a may be further based on a time index and an uninvertible one-way function.

In one configuration, referring to FIG. 7, the authentication request 706 and the authentication proof 708a may be transmitted simultaneously and via different subcarriers.

In one configuration, referring to FIG. 7, the authentication request 706 and the authentication proof 708a may be transmitted via adjacent time-frequency resources. The authentication proof 708a may be further based on the random phase and a one-way hash function.

In one configuration, referring to FIG. 7, the authentication proof 708b may be transmitted to the second network node 704 after the configuration request 714 is received from the second network node 704.

In one configuration, referring to FIG. 7, the authentication proof 708b may be further based on the configuration request 714.

In one configuration, referring to FIG. 7, the authentication proof 708b may be associated with a plurality of tones.

In one configuration, referring to FIG. 7, the configuration request 714 and the configuration response 718 may be each associated with a plurality of tones.

In one configuration, referring to FIG. 7, a first transmission from the first network node 702 to the second network node 704 may be subjected to a first phase rotation associated with the first transmission that is reciprocal to a second phase rotation associated with a second transmission from the second network node 704 to the first network node 702. The second transmission may be subjected to the second phase rotation.

In one configuration, referring to FIG. 7, the first network node 702 may be authenticable based on a distribution-based hypothesis test or a Hamming distance-based similarity test.

Figure 10:
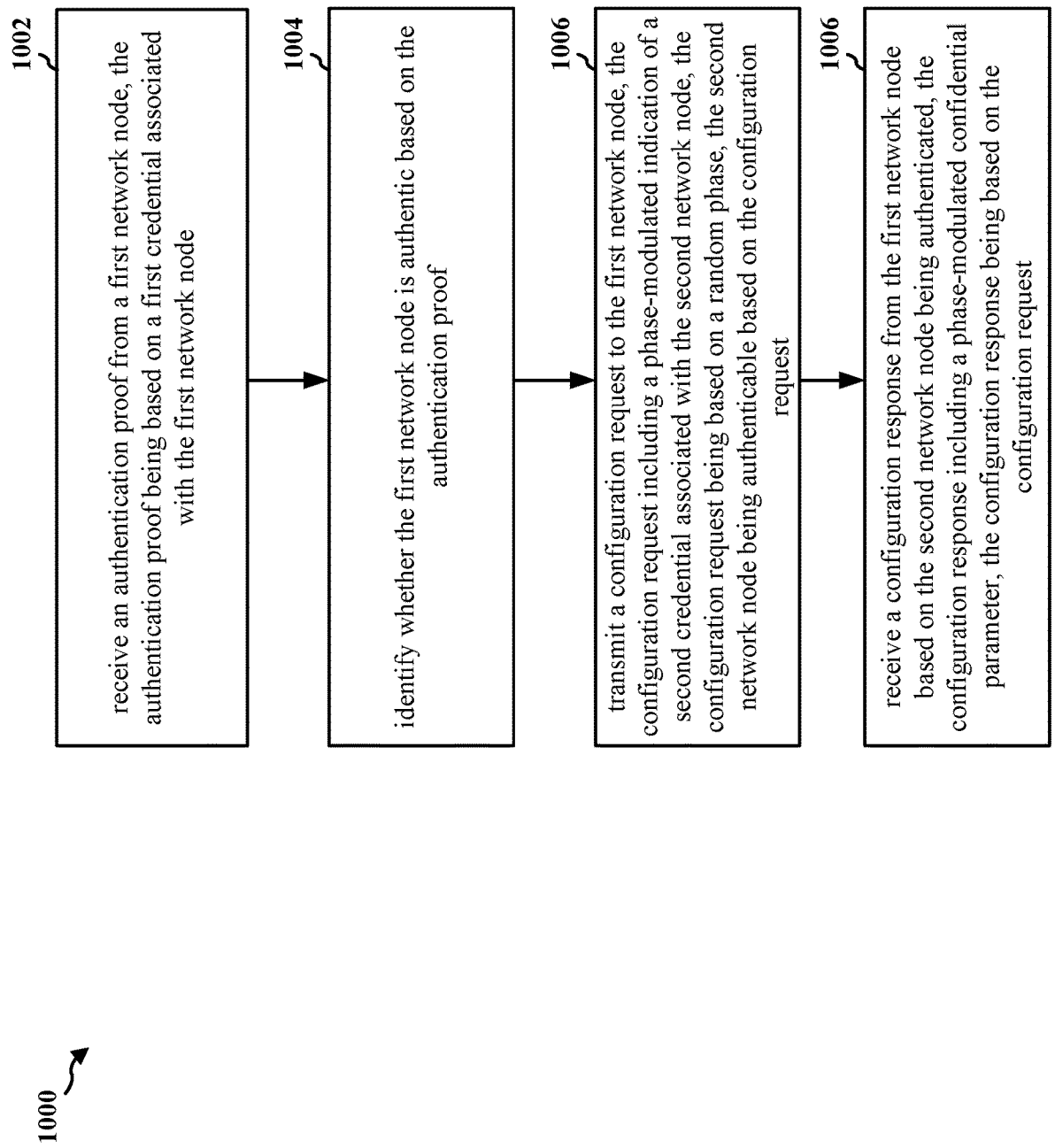
FIG. 10 is a flowchart of a method of wireless communication, in accordance with various aspects of the present disclosure.

FIG. 10 is a flowchart 1000 of a method of wireless communication. The method may be performed by a UE or a second (receiving) network node (e.g., the UE 104/350; the receiver 502/602; the second network node 704; the apparatus 1204). At 1002, the second network node may receive an authentication proof from a first network node. The authentication proof may be based on a first credential associated with the first network node. For example, 1002 may be performed by the component 198 in FIG. 12. Referring to FIG. 7, at 708a or 708b, the second network node 704 may receive an authentication proof from a first network node 702.

At 1004, the second network node may identify whether the first network node is authentic based on the authentication proof. For example, 1004 may be performed by the component 198 in FIG. 12. Referring to FIG. 7, at 712a or 712b, the second network node 704 may identify whether the first network node 702 is authentic based on the authentication proof 708a or 708b.

At 1006, the second network node may transmit a configuration request to the first network node. The configuration request may include a phase-modulated indication of a second credential associated with the second network node. The configuration request may be based on a random phase. The second network node may be authenticable based on the configuration request. For example, 1006 may be performed by the component 198 in FIG. 12. Referring to FIG. 7, at 714, the second network node 704 may transmit a configuration request to the first network node 702.

At 1008, the second network node may receive a configuration response from the first network node based on the second network node being authenticated. The configuration response may include a phase-modulated confidential parameter. The configuration response may be based on the configuration request. For example, 1008 may be performed by the component 198 in FIG. 12. Referring to FIG. 7, at 718, the second network node 704 may receive a configuration response from the first network node 702 based on the second network node 704 being authenticated.

Figure 11:
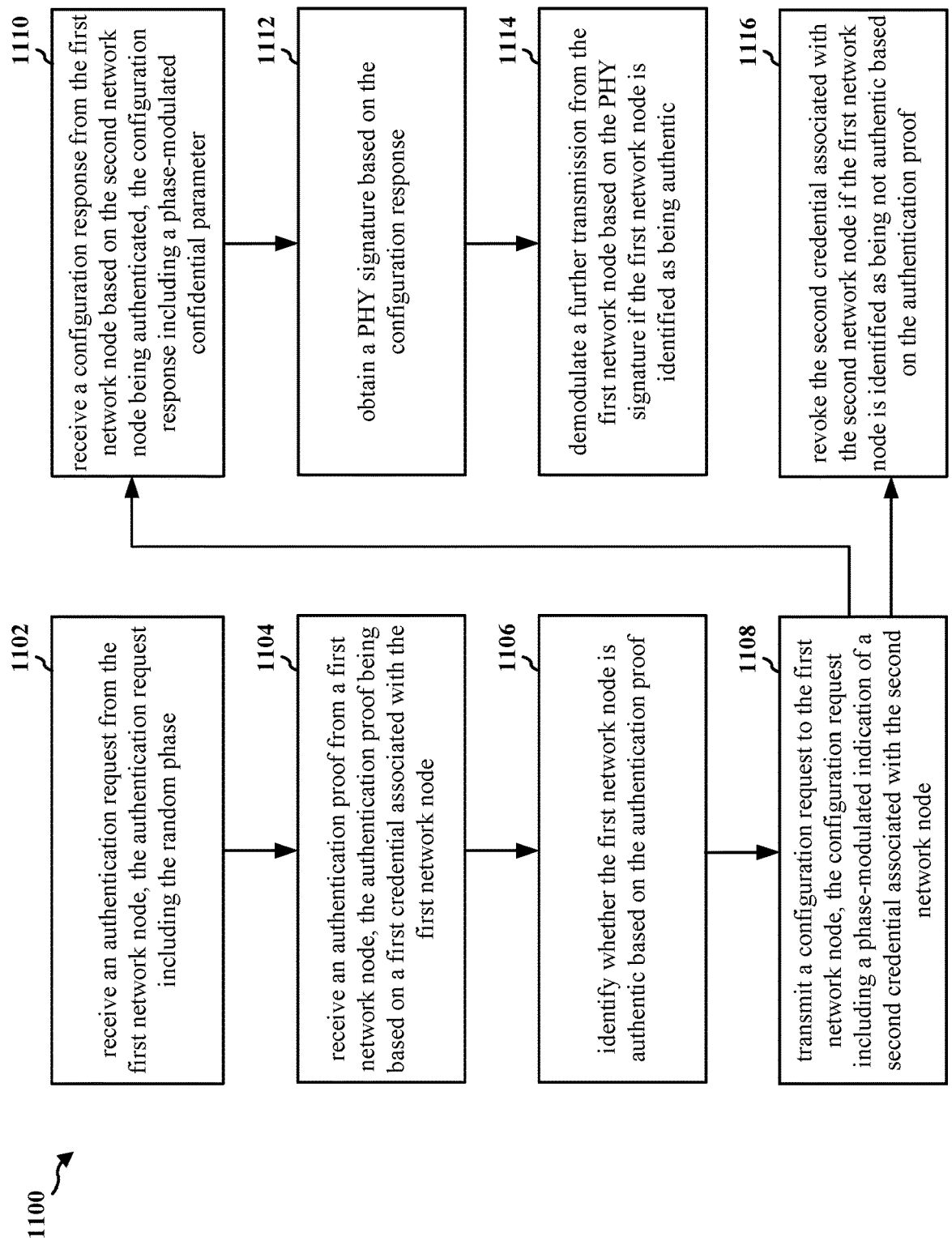
FIG. 11 is a flowchart of a method of wireless communication, in accordance with various aspects of the present disclosure.

FIG. 11 is a flowchart 1100 of a method of wireless communication. The method may be performed by a UE or a second (receiving) network node (e.g., the UE 104/350; the receiver 502/602; the second network node 704; the apparatus 1204). At 1104, the second network node may receive an authentication proof from a first network node. The authentication proof may be based on a first credential associated with the first network node. For example, 1104 may be performed by the component 198 in FIG. 12. Referring to FIG. 7, at 708a or 708b, the second network node 704 may receive an authentication proof from a first network node 702.

At 1106, the second network node may identify whether the first network node is authentic based on the authentication proof. For example, 1106 may be performed by the component 198 in FIG. 12. Referring to FIG. 7, at 712a or 712b, the second network node 704 may identify whether the first network node 702 is authentic based on the authentication proof 708a or 708b.

At 1108, the second network node may transmit a configuration request to the first network node. The configuration request may include a phase-modulated indication of a second credential associated with the second network node. The configuration request may be based on a random phase. The second network node may be authenticable based on the configuration request. For example, 1108 may be performed by the component 198 in FIG. 12. Referring to FIG. 7, at 714, the second network node 704 may transmit a configuration request to the first network node 702.

At 1110, the second network node may receive a configuration response from the first network node based on the second network node being authenticated. The configuration response may include a phase-modulated confidential parameter. The configuration response may be based on the configuration request. For example, 1110 may be performed by the component 198 in FIG. 12. Referring to FIG. 7, at 718, the second network node 704 may receive a configuration response from the first network node 702 based on the second network node 704 being authenticated.

In one configuration, at 1102, the second network node may receive an authentication request from the first network node. The authentication request may include the random phase. For example, 1102 may be performed by the component 198 in FIG. 12. Referring to FIG. 7, at 706, the second network node 704 may receive an authentication request from the first network node 702.

At 1112, the second network node may obtain a PHY signature based on the configuration response. For example, 1112 may be performed by the component 198 in FIG. 12. Referring to FIG. 7, at 720, the second network node 704 may obtain a PHY signature based on the configuration response 718.

At 1114, the second network node may demodulate a further transmission from the first network node based on the PHY signature if the first network node is identified as being authentic. For example, 1114 may be performed by the component 198 in FIG. 12. Referring to FIG. 7, at 722a, the second network node 704 may demodulate a further transmission from the first network node 702 based on the PHY signature if the first network node 702 is identified as being authentic.

In one configuration, referring to FIG. 7, the authentication request 706 may be associated with a random beam.

In one configuration, referring to FIG. 7, the authentication proof 708a may be received from the first network node 702 prior to the configuration request 714 being transmitted to the first network node 702. The configuration request 714 may be transmitted to the first network node 702 if the first network node is identified as being authentic based on the authentication proof 708a.

In one configuration, referring to FIG. 7, the authentication proof 708a may be further based on a time index and an uninvertible one-way function.

In one configuration, referring to FIG. 7, the authentication request 706 and the authentication proof 708a may be received simultaneously and via different subcarriers.

In one configuration, referring to FIG. 7, the authentication request 706 and the authentication proof 708a may be received via adjacent time-frequency resources. The authentication proof 708a may be further based on the random phase and a one-way hash function.

In one configuration, referring to FIG. 7, the authentication proof 708b may be received from the first network node 702 after the configuration request 714 is transmitted to the first network node 702.

In one configuration, referring to FIG. 7, the authentication proof 708b may be further based on the configuration request 714.

In one configuration, at 1116, the second network node may revoke the second credential associated with the second network node if the first network node is identified as being not authentic based on the authentication proof. For example, 1116 may be performed by the component 198 in FIG. 12. Referring to FIG. 7, at 722b, the second network node 704 may revoke the second credential associated with the second network node 704 if the first network node 702 is identified as being not authentic based on the authentication proof 708b.

In one configuration, referring to FIG. 7, the authentication proof 708b may be associated with a plurality of tones.

In one configuration, referring to FIG. 7, the configuration request 714 and the configuration response 718 may be each associated with a plurality of tones.

In one configuration, referring to FIG. 7, a first transmission from the first network node 702 to the second network node 704 may be subjected to a first phase rotation associated with the first transmission that is reciprocal to a second phase rotation associated with a second transmission from the second network node 704 to the first network node 702. The second transmission may be subjected to the second phase rotation.

In one configuration, referring to FIG. 7, whether the first network node 702 is authentic may be identified based on a first distribution-based hypothesis test or a first Hamming distance-based similarity test. The second network node 704 may be authenticable based on a second distribution-based hypothesis test or a second Hamming distance-based similarity test.

Figure 12:
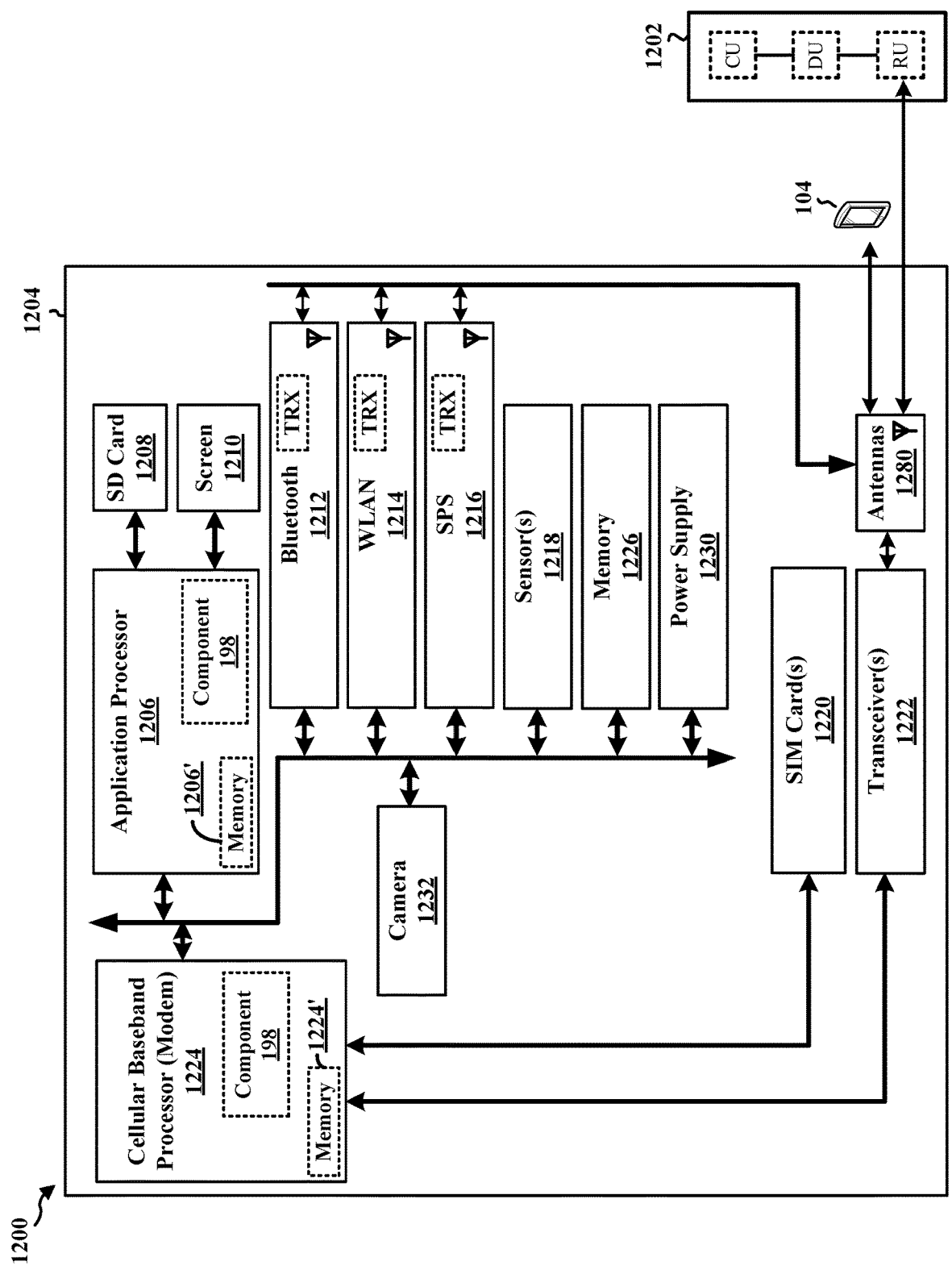
FIG. 12 is a diagram illustrating an example of a hardware implementation for an example apparatus and/or network entity, in accordance with various aspects of the present disclosure.

FIG. 12 is a diagram 1200 illustrating an example of a hardware implementation for an apparatus 1204. The apparatus 1204 may be a UE, a component of a UE, or may implement UE functionality. In some aspects, the apparatus 1204 may include a cellular baseband processor 1224 (also referred to as a modem) coupled to one or more transceivers 1222 (e.g., cellular RF transceiver). The cellular baseband processor 1224 may include on-chip memory 1224'. In some aspects, the apparatus 1204 may further include one or more subscriber identity modules (SIM) cards 1220 and an application processor 1206 coupled to a secure digital (SD) card 1208 and a screen 1210. The application processor 1206 may include on-chip memory 1206'. In some aspects, the apparatus 1204 may further include a Bluetooth module 1212, a WLAN module 1214, an SPS module 1216 (e.g., GNSS module), one or more sensor modules 1218 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1226, a power supply 1230, and/or a camera 1232. The Bluetooth module 1212, the WLAN module 1214, and the SPS module 1216 may include an on-chip transceiver (TRX) (or in some cases, just a receiver (RX)). The Bluetooth module 1212, the WLAN module 1214, and the SPS module 1216 may include their own dedicated antennas and/or utilize the antennas 1280 for communication. The cellular baseband processor 1224 communicates through the transceiver(s) 1222 via one or more antennas 1280 with the UE 104 and/or with an RU associated with a network entity 1202. The cellular baseband processor 1224 and the application processor 1206 may each include a computer-readable medium/memory 1224', 1206', respectively. The additional memory modules 1226 may also be considered a computer-readable medium/memory. Each computer-readable medium/memory 1224', 1206', 1226 may be non-transitory. The cellular baseband processor 1224 and the application processor 1206 are each responsible for general processing, including the execution of software stored on the computer-readable medium/memory. The software, when executed by the cellular baseband processor 1224/application processor 1206, causes the cellular baseband processor 1224/application processor 1206 to perform the various functions described supra. The computer-readable medium/memory may also be used for storing data that is manipulated by the cellular baseband processor 1224/application processor 1206 when executing software. The cellular baseband processor 1224/application processor 1206 may be a component of the UE 350 and may include the memory 360 and/or at least one of the TX processor 368, the RX processor 356, and the controller/processor 359. In one configuration, the apparatus 1204 may be a processor chip (modem and/or application) and include just the cellular baseband processor 1224 and/or the application processor 1206, and in another configuration, the apparatus 1204 may be the entire UE (e.g., see 350 of FIG. 3) and include the additional modules of the apparatus 1204.

As discussed supra, the component 198 is configured to receive an authentication proof from a first network node. The authentication proof may be based on a first credential associated with the first network node. The component 198 may be configured to identify whether the first network node is authentic based on the authentication proof. The component 198 may be configured to transmit a configuration request to the first network node. The configuration request may include a phase-modulated indication of a second credential associated with the second network node. The configuration request may be based on a random phase. The second network node may be authenticable based on the configuration request. The component 198 may be configured to receive a configuration response from the first network node based on the second network node being authenticated. The configuration response may include a phase-modulated confidential parameter. The configuration response may be based on the configuration request. The component 198 may be within the cellular baseband processor 1224, the application processor 1206, or both the cellular baseband processor 1224 and the application processor 1206. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1204 may include a variety of components configured for various functions. In one configuration, the apparatus 1204, and in particular the cellular baseband processor 1224 and/or the application processor 1206, includes means for receiving an authentication proof from a first network node. The authentication proof may be based on a first credential associated with the first network node. The apparatus 1204, and in particular the cellular baseband processor 1224 and/or the application processor 1206, includes means for identifying whether the first network node is authentic based on the authentication proof. The apparatus 1204, and in particular the cellular baseband processor 1224 and/or the application processor 1206, includes means for transmitting a configuration request to the first network node. The configuration request may include a phase-modulated indication of a second credential associated with the second network node. The configuration request may be based on a random phase. The second network node may be authenticable based on the configuration request. The apparatus 1204, and in particular the cellular baseband processor 1224 and/or the application processor 1206, includes means for receiving a configuration response from the first network node based on the second network node being authenticated. The configuration response may include a phase-modulated confidential parameter. The configuration response may be based on the configuration request.

In one configuration, the apparatus 1204, and in particular the cellular baseband processor 1224 and/or the application processor 1206, includes means for receiving an authentication request from the first network node. The authentication request may include the random phase. The apparatus 1204, and in particular the cellular baseband processor 1224 and/or the application processor 1206, includes means for obtaining a PHY signature based on the configuration response. The apparatus 1204, and in particular the cellular baseband processor 1224 and/or the application processor 1206, includes means for demodulating a further transmission from the first network node based on the PHY signature if the first network node is identified as being authentic. In one configuration, the authentication request may be associated with a random beam. In one configuration, the authentication proof may be received from the first network node prior to the configuration request being transmitted to the first network node. The configuration request may be transmitted to the first network node if the first network node is identified as being authentic based on the authentication proof. In one configuration, the authentication proof may be further based on a time index and an uninvertible one-way function. In one configuration, the authentication request and the authentication proof may be received simultaneously and via different subcarriers. In one configuration, the authentication request and the authentication proof may be received via adjacent time-frequency resources. The authentication proof may be further based on the random phase and a one-way hash function. In one configuration, the authentication proof may be received from the first network node after the configuration request is transmitted to the first network node. In one configuration, the authentication proof may be further based on the configuration request. In one configuration, the apparatus 1204, and in particular the cellular baseband processor 1224 and/or the application processor 1206, includes means for revoking the second credential associated with the second network node if the first network node is identified as being not authentic based on the authentication proof. In one configuration, the authentication proof may be associated with a plurality of tones. In one configuration, the configuration request and the configuration response may be each associated with a plurality of tones. In one configuration, a first transmission from the first network node to the second network node may be subjected to a first phase rotation associated with the first transmission that is reciprocal to a second phase rotation associated with a second transmission from the second network node to the first network node. The second transmission may be subjected to the second phase rotation. In one configuration, whether the first network node is authentic may be identified based on a first distribution-based hypothesis test or a first Hamming distance-based similarity test. The second network node may be authenticable based on a second distribution-based hypothesis test or a second Hamming distance-based similarity test.

The means may be the component 198 of the apparatus 1204 configured to perform the functions recited by the means. As described supra, the apparatus 1204 may include the TX processor 368, the RX processor 356, and the controller/processor 359. As such, in one configuration, the means may be the TX processor 368, the RX processor 356, and/or the controller/processor 359 configured to perform the functions recited by the means.

Figure 13:
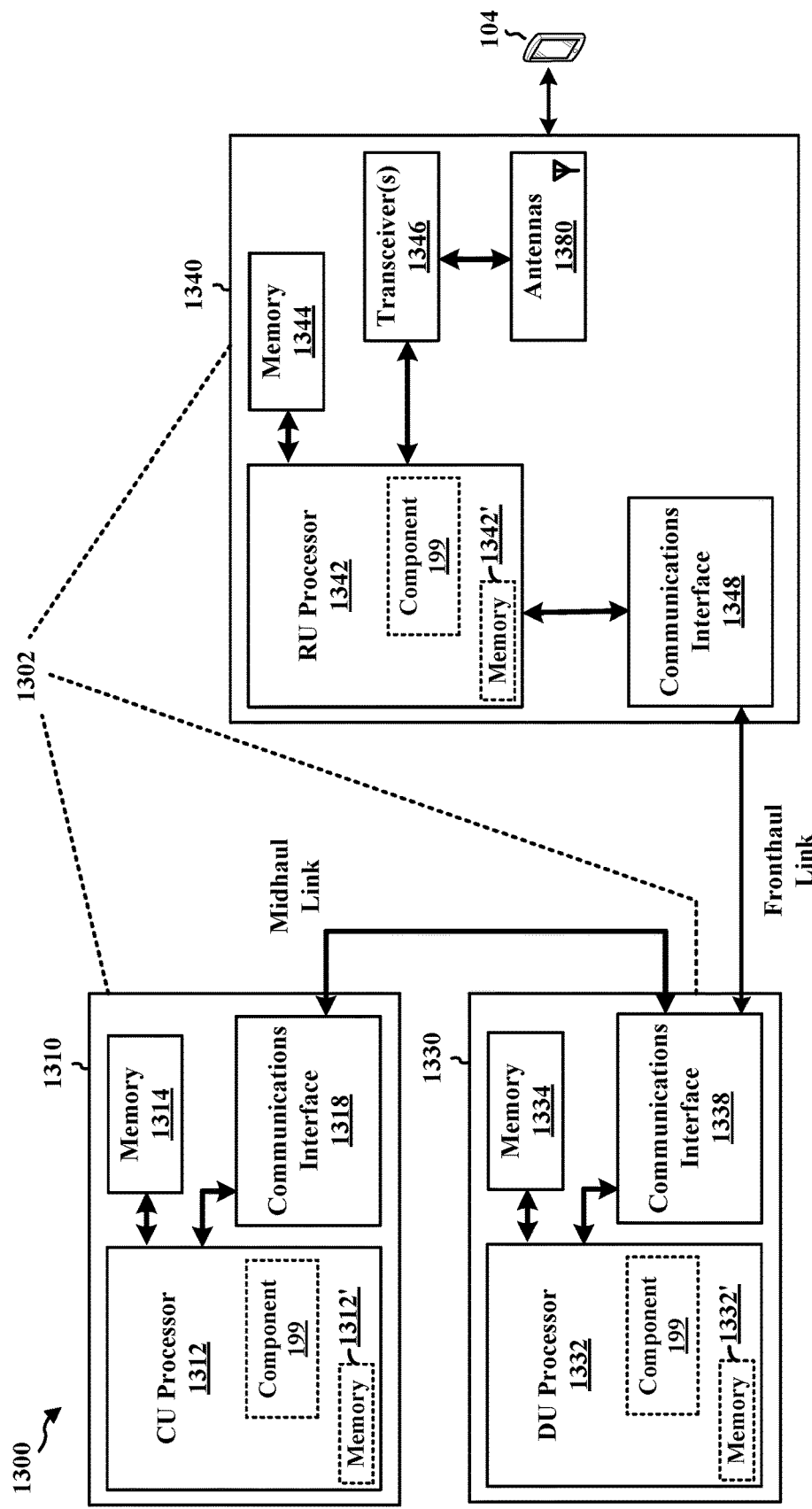
FIG. 13 is a diagram illustrating an example of a hardware implementation for an example network entity, in accordance with various aspects of the present disclosure.

FIG. 13 is a diagram 1300 illustrating an example of a hardware implementation for a network entity 1302. The network entity 1302 may be a BS, a component of a BS, or may implement BS functionality. The network entity 1302 may include at least one of a CU 1310, a DU 1330, or an RU 1340. For example, depending on the layer functionality handled by the component 199, the network entity 1302 may include the CU 1310; both the CU 1310 and the DU 1330; each of the CU 1310, the DU 1330, and the RU 1340; the DU 1330; both the DU 1330 and the RU 1340; or the RU 1340. The CU 1310 may include a CU processor 1312. The CU processor 1312 may include on-chip memory 1312'. In some aspects, the CU 1310 may further include additional memory modules 1314 and a communications interface 1318. The CU 1310 communicates with the DU 1330 through a midhaul link, such as an F1 interface. The DU 1330 may include a DU processor 1332. The DU processor 1332 may include on-chip memory 1332'. In some aspects, the DU 1330 may further include additional memory modules 1334 and a communications interface 1338. The DU 1330 communicates with the RU 1340 through a fronthaul link. The RU 1340 may include an RU processor 1342. The RU processor 1342 may include on-chip memory 1342'. In some aspects, the RU 1340 may further include additional memory modules 1344, one or more transceivers 1346, antennas 1380, and a communications interface 1348. The RU 1340 communicates with the UE 104. The on-chip memory 1312', 1332', 1342' and the additional memory modules 1314, 1334, 1344 may each be considered a computer-readable medium/memory. Each computer-readable medium/memory may be non-transitory. Each of the processors 1312, 1332, 1342 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 is configured to transmit an authentication proof to a second network node. The authentication proof may be based on a first credential associated with the first network node. The first network node may be authenticable based on the authentication proof. The component 199 may be configured to receive a configuration request from the second network node. The configuration request may include a phase-modulated indication of a second credential associated with the second network node. The configuration request may be based on a random phase. The component 199 may be configured to transmit a configuration response to the second network node. The configuration response may include a phase-modulated confidential parameter. The configuration response may be based on the configuration request. The component 199 may be within one or more processors of one or more of the CU 1310, DU 1330, and the RU 1340. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1302 may include a variety of components configured for various functions. In one configuration, the network entity 1302 includes means for transmitting an authentication proof to a second network node. The authentication proof may be based on a first credential associated with the first network node. The first network node may be authenticable based on the authentication proof. The network entity 1302 includes means for receiving a configuration request from the second network node. The configuration request may include a phase-modulated indication of a second credential associated with the second network node. The configuration request may be based on a random phase. The network entity 1302 includes means for transmitting a configuration response to the second network node. The configuration response may include a phase-modulated confidential parameter. The configuration response may be based on the configuration request.

In one configuration, the network entity 1302 includes means for transmitting an authentication request to the second network node. The authentication request may include the random phase. The network entity 1302 includes means for identifying whether the second network node is authentic based on the configuration request. The configuration response may be transmitted to the second network node if the second network node is identified as being authentic. In one configuration, the authentication request may be associated with a randomly selected beam. In one configuration, whether the second network node is authentic may be identified based on a distribution-based hypothesis test or a Hamming distance-based similarity test. In one configuration, the authentication proof may be transmitted to the second network node prior to the configuration request being received from the second network node. The configuration request may be received from the second network node based on the first network node being authenticated based on the authentication proof. In one configuration, the authentication proof may be further based on a time index and an uninvertible one-way function. In one configuration, the authentication request and the authentication proof may be transmitted simultaneously and via different subcarriers. In one configuration, the authentication request and the authentication proof may be transmitted via adjacent time-frequency resources. The authentication proof may be further based on the random phase and a one-way hash function. In one configuration, the authentication proof may be transmitted to the second network node after the configuration request is received from the second network node. In one configuration, the authentication proof may be further based on the configuration request. In one configuration, the authentication proof may be associated with a plurality of tones. In one configuration, the configuration request and the configuration response may be each associated with a plurality of tones. In one configuration, a first transmission from the first network node to the second network node may be subjected to a first phase rotation associated with the first transmission that is reciprocal to a second phase rotation associated with a second transmission from the second network node to the first network node. The second transmission may be subjected to the second phase rotation. In one configuration, the first network node may be authenticable based on a distribution-based hypothesis test or a Hamming distance-based similarity test.

The means may be the component 199 of the network entity 1302 configured to perform the functions recited by the means. As described supra, the network entity 1302 may include the TX processor 316, the RX processor 370, and the controller/processor 375. As such, in one configuration, the means may be the TX processor 316, the RX processor 370, and/or the controller/processor 375 configured to perform the functions recited by the means.

Referring to FIGS. 4-13, a first network node may transmit an authentication proof to a second network node. The authentication proof may be based on a first credential associated with the first network node. The first network node may be authenticable based on the authentication proof. The second network node may identify whether the first network node is authentic based on the authentication proof. The second network node may transmit a configuration request to the first network node. The configuration request may include a phase-modulated indication of a second credential associated with the second network node. The configuration request may be based on a random phase. The second network node may be authenticable based on the configuration request. The first network node may transmit a configuration response to the second network node. The configuration response may include a phase-modulated confidential parameter. The configuration response may be based on the configuration request. Accordingly, in a configuration sharing process, the transmitter (the first network node) and the receiver (the second network node) may be mutually authenticated. As a result, an adversarial device may not be able to manipulate the receiver by transmitting a fake configuration. Further, the transmitter may not transmit the confidential configuration to a fake receiver.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a first network node, including transmitting an authentication proof to a second network node, the authentication proof being based on a first credential associated with the first network node, the first network node being authenticable based on the authentication proof; receiving a configuration request from the second network node, the configuration request including a phase-modulated indication of a second credential associated with the second network node, the configuration request being based on a random phase; and transmitting a configuration response to the second network node, the configuration response including a phase-modulated confidential parameter, the configuration response being based on the configuration request.

Aspect 2 is the method of aspect 1, further including: transmitting an authentication request to the second network node, the authentication request including the random phase; and identifying whether the second network node is authentic based on the configuration request, where the configuration response is transmitted to the second network node if the second network node is identified as being authentic.

Aspect 3 is the method of aspect 2, where the authentication request is associated with a randomly selected beam.

Aspect 4 is the method of any of aspects 2 and 3, where whether the second network node is authentic is identified based on a distribution-based hypothesis test or a Hamming distance-based similarity test.

Aspect 5 is the method of any of aspects 2 to 4, where the authentication proof is transmitted to the second network node prior to the configuration request being received from the second network node, and the configuration request is received from the second network node based on the first network node being authenticated based on the authentication proof.

Aspect 6 is the method of aspect 5, where the authentication proof is further based on a time index and an uninvertible one-way function.

Aspect 7 is the method of any of aspects 5 and 6, where the authentication request and the authentication proof are transmitted simultaneously and via different subcarriers.

Aspect 8 is the method of any of aspects 5 and 6, where the authentication request and the authentication proof are transmitted via adjacent time-frequency resources, and the authentication proof is further based on the random phase and a one-way hash function.

Aspect 9 is the method of any of aspects 1 to 4, where the authentication proof is transmitted to the second network node after the configuration request is received from the second network node.

Aspect 10 is the method of aspect 9, where the authentication proof is further based on the configuration request.

Aspect 11 is the method of any of aspects 9 and 10, where the authentication proof is associated with a plurality of tones.

Aspect 12 is the method of any of aspects 1 to 11, where the configuration request and the configuration response are each associated with a plurality of tones.

Aspect 13 is the method of any of aspects 1 to 12, where a first transmission from the first network node to the second network node is subjected to a first phase rotation associated with the first transmission that is reciprocal to a second phase rotation associated with a second transmission from the second network node to the first network node, and the second transmission is subjected to the second phase rotation.

Aspect 14 is the method of any of aspects 1 to 13, where the first network node is authenticable based on a distribution-based hypothesis test or a Hamming distance-based similarity test.

Aspect 15 is a method of wireless communication at a second network node, including receiving an authentication proof from a first network node, the authentication proof being based on a first credential associated with the first network node; identifying whether the first network node is authentic based on the authentication proof; transmitting a configuration request to the first network node, the configuration request including a phase-modulated indication of a second credential associated with the second network node, the configuration request being based on a random phase, the second network node being authenticable based on the configuration request; and receiving a configuration response from the first network node based on the second network node being authenticated, the configuration response including a phase-modulated confidential parameter, the configuration response being based on the configuration request.

Aspect 16 is the method of aspect 15, further including: receiving an authentication request from the first network node, the authentication request including the random phase; obtaining a PHY signature based on the configuration response; and demodulating a further transmission from the first network node based on the PHY signature if the first network node is identified as being authentic.

Aspect 17 is the method of aspect 16, where the authentication request is associated with a random beam.

Aspect 18 is the method of any of aspects 16 and 17, where the authentication proof is received from the first network node prior to the configuration request being transmitted to the first network node, and the configuration request is transmitted to the first network node if the first network node is identified as being authentic based on the authentication proof.

Aspect 19 is the method of aspect 18, where the authentication proof is further based on a time index and an uninvertible one-way function.

Aspect 20 is the method of any of aspects 18 and 19, where the authentication request and the authentication proof are received simultaneously and via different subcarriers.

Aspect 21 is the method of any of aspects 18 and 19, where the authentication request and the authentication proof are received via adjacent time-frequency resources, and the authentication proof is further based on the random phase and a one-way hash function.

Aspect 22 is the method of any of aspects 15 to 17, where the authentication proof is received from the first network node after the configuration request is transmitted to the first network node.

Aspect 23 is the method of aspect 22, where the authentication proof is further based on the configuration request.

Aspect 24 is the method of any of aspects 22 and 23, further including: revoking the second credential associated with the second network node if the first network node is identified as being not authentic based on the authentication proof.

Aspect 25 is the method of any of aspects 22 to 24, where the authentication proof is associated with a plurality of tones.

Aspect 26 is the method of any of aspects 15 to 25, where the configuration request and the configuration response are each associated with a plurality of tones.

Aspect 27 is the method of any of aspects 15 to 26, where a first transmission from the first network node to the second network node is subjected to a first phase rotation associated with the first transmission that is reciprocal to a second phase rotation associated with a second transmission from the second network node to the first network node, and the second transmission is subjected to the second phase rotation.

Aspect 28 is the method of any of aspects 15 to 27, where whether the first network node is authentic is identified based on a first distribution-based hypothesis test or a first Hamming distance-based similarity test, and the second network node is authenticable based on a second distribution-based hypothesis test or a second Hamming distance-based similarity test.

Aspect 29 is an apparatus for wireless communication including at least one processor coupled to a memory and, based at least in part on information stored in the memory, the at least one processor is configured to implement a method as in any of aspects 1 to 28.

Aspect 30 may be combined with aspect 29 and further includes a transceiver coupled to the at least one processor.

Aspect 31 is an apparatus for wireless communication including means for implementing any of aspects 1 to 28.

Aspect 32 is a non-transitory computer-readable storage medium storing computer executable code, where the code when executed by a processor causes the processor to implement any of aspects 1 to 28.

Various aspects have been described herein. These and other aspects are within the scope of the following claims.

What is claimed is:

1. An apparatus for wireless communication at a first network node, comprising:
a memory; and
at least one processor coupled to the memory and, based at least in part on information stored in the memory, the at least one processor is configured to:
transmit an authentication proof to a second network node, the authentication proof being based on a first credential associated with the first network node, the first network node being authenticable based on the authentication proof;
receive a configuration request from the second network node, the configuration request including a phase-modulated indication of a second credential associated with the second network node, the configuration request being based on a random phase; and
transmit a configuration response to the second network node, the configuration response including a phase-modulated confidential parameter, the configuration response being based on the configuration request.

2. The apparatus of claim 1, the at least one processor being further configured to:
transmit an authentication request to the second network node, the authentication request including the random phase; and
identify whether the second network node is authentic based on the configuration request, wherein the configuration response is transmitted to the second network node if the second network node is identified as being authentic.

3. The apparatus of claim 2, wherein the authentication request is associated with a randomly selected beam.

4. The apparatus of claim 2, wherein whether the second network node is authentic is identified based on a distribution-based hypothesis test or a Hamming distance-based similarity test.

5. The apparatus of claim 2, wherein the authentication proof is transmitted to the second network node prior to the configuration request being received from the second network node, and the configuration request is received from the second network node based on the first network node being authenticated based on the authentication proof.

6. The apparatus of claim 5, wherein the authentication proof is further based on a time index and an uninvertible one-way function.

7. The apparatus of claim 5, wherein the authentication request and the authentication proof are transmitted simultaneously and via different subcarriers.

8. The apparatus of claim 5, wherein the authentication request and the authentication proof are transmitted via adjacent time-frequency resources, and the authentication proof is further based on the random phase and a one-way hash function.

9. The apparatus of claim 1, wherein the authentication proof is transmitted to the second network node after the configuration request is received from the second network node.

10. The apparatus of claim 9, wherein the authentication proof is further based on the configuration request.

11. The apparatus of claim 9, wherein the authentication proof is associated with a plurality of tones.

12. The apparatus of claim 1, wherein the configuration request and the configuration response are each associated with a plurality of tones.

13. The apparatus of claim 1, wherein a first transmission from the first network node to the second network node is subjected to a first phase rotation associated with the first transmission that is reciprocal to a second phase rotation associated with a second transmission from the second network node to the first network node, and the second transmission is subjected to the second phase rotation.

14. The apparatus of claim 1, further comprising a transceiver coupled to the at least one processor, wherein the first network node is authenticable based on a distribution-based hypothesis test or a Hamming distance-based similarity test.

15. A method of wireless communication at a first network node, comprising:
transmitting an authentication proof to a second network node, the authentication proof being based on a first credential associated with the first network node, the first network node being authenticable based on the authentication proof;
receiving a configuration request from the second network node, the configuration request including a phase-modulated indication of a second credential associated with the second network node, the configuration request being based on a random phase; and
transmitting a configuration response to the second network node, the configuration response including a phase-modulated confidential parameter, the configuration response being based on the configuration request.

16. An apparatus for wireless communication at a second network node, comprising:
a memory; and
at least one processor coupled to the memory and, based at least in part on information stored in the memory, the at least one processor is configured to:
receive an authentication proof from a first network node, the authentication proof being based on a first credential associated with the first network node;
identify whether the first network node is authentic based on the authentication proof;
transmit a configuration request to the first network node, the configuration request including a phase-modulated indication of a second credential associated with the second network node, the configuration request being based on a random phase, the second network node being authenticable based on the configuration request; and
receive a configuration response from the first network node based on the second network node being authenticated, the configuration response including a phase-modulated confidential parameter, the configuration response being based on the configuration request.

17. The apparatus of claim 16, the at least one processor being further configured to:
receive an authentication request from the first network node, the authentication request including the random phase;
obtain a physical layer (PHY) signature based on the configuration response; and
demodulate a further transmission from the first network node based on the PHY signature if the first network node is identified as being authentic.

18. The apparatus of claim 17, wherein the authentication request is associated with a random beam.

19. The apparatus of claim 17, wherein the authentication proof is received from the first network node prior to the configuration request being transmitted to the first network node, and the configuration request is transmitted to the first network node if the first network node is identified as being authentic based on the authentication proof.

20. The apparatus of claim 19, wherein the authentication proof is further based on a time index and an uninvertible one-way function.

21. The apparatus of claim 19, wherein the authentication request and the authentication proof are received simultaneously and via different subcarriers.

22. The apparatus of claim 19, wherein the authentication request and the authentication proof are received via adjacent time-frequency resources, and the authentication proof is further based on the random phase and a one-way hash function.

23. The apparatus of claim 16, wherein the authentication proof is received from the first network node after the configuration request is transmitted to the first network node.

24. The apparatus of claim 23, wherein the authentication proof is further based on the configuration request.

25. The apparatus of claim 23, the at least one processor being further configured to:
revoke the second credential associated with the second network node if the first network node is identified as being not authentic based on the authentication proof.

26. The apparatus of claim 23, wherein the authentication proof is associated with a plurality of tones.

27. The apparatus of claim 16, wherein the configuration request and the configuration response are each associated with a plurality of tones.

28. The apparatus of claim 16, wherein a first transmission from the first network node to the second network node is subjected to a first phase rotation associated with the first transmission that is reciprocal to a second phase rotation associated with a second transmission from the second network node to the first network node, and the second transmission is subjected to the second phase rotation.

29. The apparatus of claim 16, further comprising a transceiver coupled to the at least one processor, wherein whether the first network node is authentic is identified based on a first distribution-based hypothesis test or a first Hamming distance-based similarity test, and the second network node is authenticable based on a second distribution-based hypothesis test or a second Hamming distance-based similarity test.

30. A method of wireless communication at a second network node, comprising:
- receiving an authentication proof from a first network node, the authentication proof being based on a first credential associated with the first network node;
- identifying whether the first network node is authentic based on the authentication proof;
- transmitting a configuration request to the first network node, the configuration request including a phase-modulated indication of a second credential associated with the second network node, the configuration request being based on a random phase, the second network node being authenticable based on the configuration request; and
- receiving a configuration response from the first network node based on the second network node being authenticated, the configuration response including a phase-modulated confidential parameter, the configuration response being based on the configuration request.

* * * * *